United States Patent
Wang et al.

(10) Patent No.: US 12,494,238 B2
(45) Date of Patent: Dec. 9, 2025

(54) STOCHASTIC COMPUTING USING LOGIC-MEMORY CELLS

(71) Applicant: Regents of the University of Minnesota, Minneapolis, MN (US)

(72) Inventors: Jian-Ping Wang, Minneapolis, MN (US); Brandon Zink, Minneapolis, MN (US); Yang Lv, Minneapolis, MN (US)

(73) Assignee: Regents of the University of Minnesota, Minneapolis, MN (US)

( * ) Notice: Subject to any disclaimer, the term of this patent is extended or adjusted under 35 U.S.C. 154(b) by 217 days.

(21) Appl. No.: 18/454,441

(22) Filed: Aug. 23, 2023

(65) Prior Publication Data

US 2024/0071445 A1   Feb. 29, 2024

Related U.S. Application Data

(60) Provisional application No. 63/373,392, filed on Aug. 24, 2022.

(51) Int. Cl.
*G11C 7/22* (2006.01)
*G11C 7/10* (2006.01)

(52) U.S. Cl.
CPC ............ *G11C 7/222* (2013.01); *G11C 7/1069* (2013.01); *G11C 7/109* (2013.01)

(58) Field of Classification Search
CPC ....... G11C 7/222; G11C 7/1069; G11C 7/109; G11C 7/225
See application file for complete search history.

(56) References Cited

U.S. PATENT DOCUMENTS

| | | | |
|---|---|---|---|
| 9,224,447 B2 | 12/2015 | Wang et al. | |
| 9,734,880 B1* | 8/2017 | Augustine | G11C 11/54 |
| 2014/0334216 A1* | 11/2014 | Wang | G11C 5/08 |
| | | | 365/63 |
| 2020/0279597 A1* | 9/2020 | Wang | G11C 11/18 |

(Continued)

OTHER PUBLICATIONS

Agrawal et al., Revisiting Stochastic Computing in the Era of Nanoscale Nonvolatile Technologies. IEEE Transactions on Very Large Scale Integration (VLSI) Systems 28, No. 12, pp. 2481-2494 (2020).

(Continued)

*Primary Examiner* — Han Yang
(74) *Attorney, Agent, or Firm* — Theodore M. Magee; Westman, Champlin & Koehler, P.A.

(57) ABSTRACT

A circuit includes a first two-state device, a second two-state device and a third two-state device, each two-state device having a first resistance in a first state and a second resistance in a second state. First control elements are configured to apply a first voltage to the first two-state device to stochastically place the first two-state device in either the first state or the second state. Second control elements are configured to apply a second voltage to the second two-state device to stochastically place the second two-state device in either the first state or the second state. Third control elements are configured to send respective currents through the first two-state device and the second two-state device so as to place the third two-state device in either the first state or the second state based on the state of the first two-state device and the state of the second two-state devices.

21 Claims, 22 Drawing Sheets

(56) References Cited

U.S. PATENT DOCUMENTS

2021/0065762 A1* 3/2021 Song ............... G11C 11/1657
2023/0195621 A1* 6/2023 Najafi ............ G06F 12/0238
711/170

OTHER PUBLICATIONS

Alaghi et al, "The Promise and Challenge of Stochastic Computing", IEEE Transactions on Computer-Aided Design of Integrated Circuits and Systems, vol. 37, No. 8, 17 pages (2018).
Alaghi et al., "Survey of stochastic computing," ACM Transactions on Embedded Computing Systems, vol. 12, No. 2s, Article 92, pp. 1-19 (2013).
Alam et al., "Exact in-memory multiplication based on deterministic stochastic computing," in Proceeding IEEE Int. Symp. Circuits Syst. (ISCAS), pp. 1-5 (2020).
Aoki et al., Reproducible trajectory on subnanosecond spin-torque magnetization switching under a zero-bias field for MgO-based ferromagnetic tunnel junctions. Applied Physics Letters 96, 4 pages (2010).
Averbeck et al., A. Neural correlations, population coding and computation. Nature Reviews Neuroscience, vol. 7, pp. 358-366 (2006).
Becle et al., "A fast, energy efficient and tunable magnetic tunnel junction based bitstream generator for stochastic computing," IEEE Transactions on Circuits and Systems—I, Regular Papers, vol. 69, No. 8, pp. 3251-3259 (2022).
Camsari et al., "P-bits for probabilistic spin logic," Appl. Phys. Rev., vol. 6, No. 1, Art. No. 011305, 11 pages (2019).
Choi et al., "An 8-bit analog-to-digital converter based on the voltage-dependent switching probability of a magnetic tunnel junction," in Proceeding of Symposium on VLSI Technology (VLSI Technology), pp. 162-163 (2015).
Choi et al., A Magnetic Tunnel Junction based True Random Number Generator with conditional perturb and real-time output probability tracking. in Technical Digest—International Electron Devices Meeting, IEDM vols., 4 pages (2015).
Chowdhury et al., "Efficient in-memory processing using spintronics," IEEE Computer Architecture Letters, vol. 17, No. 1, 7 pages (2018).
Cilasun et al., "Spiking neural networks in spintronic computational RAM," ACM Transactions on Architecture and Code Optimization, vol. 18, No. 4, 21 pages (2021).
Coninx et al, "Bayesian sensor fusion with fast and low power stochastic circuits", IEEE International Conference on Rebooting Computation (ICRC), 9 pages (2016).
Daniels et al., "Energy-efficient stochastic computing with superparamagnetic tunnel junctions," Phys. Rev. Appl., vol. 13, No. 3, Art. No. 034016, 20 pages (2020).
De Aguiar et al., "Exploring the viability of stochastic computing," in Proc. 33rd IEEE Int. Conf. Comput. Design (ICCD), pp. 391-394 (2015).
Diao et al., Spin-transfer torque switching in magnetic tunnel junctions and spin-transfer torque random access memory. Journal of Physics Condensed Matter 19, 13 pages (2007).
Faisal et al., Noise in the nervous system. Nature Reviews Neuroscience vol. 9, pp. 292-303 (2008).
Faria et al., Implementing Bayesian networks with embedded stochastic MRAM. AIP Advances 8, 9 pages (2018).
Grollier et al, "Spintronic Nanodevices for Bioinspired Computing", Proceedings of the IEEE, vol. 104, No. 10, pp. 2024-2039 (2016).
Gross et al., Application of stochastic computing in brainware. Nonlinear Theory and Its Applications, IEICE 9, 17 pages (2018).
Gupta et al., "SCRIMP: A general stochastic computing architecture using ReRAM in-memory processing," in Proc. Design, Autom. Test Eur. Conf. Exhib., 4 pages (2020).

Hassan et al., A fast fault-tolerant architecture for Sauvola local image tresholding algorithm using stochastic computing, IEEE Transactions on Very Large Scale Integration Systems, vol. 24, No. 2, pp. 808-812, 2016.
Hassan et al., "Low-barrier magnet design for efficient hardware binary stochastic neurons," IEEE Magnetics Letters, vol. 10, pp. 1-5 (2019).
Hayakawa et al., "Nanosecond random telegraph noise in in-plane magnetic tunnel junctions," Physics Review Letter, vol. 126, No. 11, 20 pages (2021).
Horowitz, Computing's energy problem (and what we can do about it). in Digest of Technical Papers—IEEE International Solid-State Circuits Conference, vol. 57, 46 pages (2014).
Hsiao et al., "Generating stochastic bitstreams," in Stochastic Computing: Techniques and Applications. Berlin, Germany: Springer, pp. 137-152 (2019).
Huang et al, "Magnetic skyrmion-based synaptic devices", Nanotechnology, vol. 28, 08LT02, 5 pages (2017).
Indiveri et al., "Memory and information processing in neuromorphic systems," Proceedings of the IEEE, vol. 103, No. 8, 17 pages (2015).
Jia et al, "Spintronics based Stochastic Computing for efficient Bayesian Inference Systems", 23rd Asia and South Pacific Design Automation Conference (ASP-DAC), 6 pages (2018).
Kaiser et al., Probabilistic Circuits for Autonomous Learning: A Simulation Study. Frontiers in Computational Neuroscience 14, 7 pages (2020).
Keckler et al., GPUs and the future of parallel computing. IEEE Computer Society, 11 pages (2011).
Khalili Amiri. et al., Low write-energy magnetic tunnel junctions for high-speed spin-transfer-torque MRAM. in IEEE Electron Device Letters, vol. 32, No. 1, pp. 57-59 (2011).
Khatamifard et al., On Memory System Design for Stochastic Computing. IEEE Computer Architecture Letters 17, 5 pages (2018).
Knag et al., "A native stochastic computing architecture enabled by memristors," IEEE Transactions on Nanotechnology, vol. 13, No. 2, pp. 283-293 (2014).
Kozial et al, "A Neuromorphic Approach to Path Planning Using a Reconfigurable Neuron Array IC", IEEE Transactions on Very Large Scale Integration (VLSI) Systems, vol. 22, No. 12, pp. 2724-2737 , (2014).
Kurenkov et al, "Device size dependence of field-free spin-orbit torque induced magnetic switching in antiferromagnetic/ ferromagnetic structures", Applied Physics Letters., vol. 110, 6 pages (2017).
LeCun et al, "Deep Learning", Nature, vol. 521, pp. 436-444 (2015).
Lequeux et al, "A magnetic synapse: multilevel spin-torque memristor with perpendicular anisotropy", Scientific Reports, vol. 6, 7 pages (2016).
Li et al, "A low power fault-tolerant architecture for the kernel density estimation based image segmentation algorithm", IEEE Int. Conf. Application-specific Syst., Architectures and Processors, pp. 161-168 (2011).
Li et al., "Case studies of logical computation on stochastic bit streams," in Integrated Circuit and System Design, Power and Timing Modeling, Optimization and Simulation (Lecture Notes in Computer Science), vol. 7606. Berlin, Germany: Springer, 10 pages (2013).
Li et al., "Computation on stochastic bit streams digital image processing case studies," IEEE Transactions on Very Large Scale Integration. (VLSI) Systems, vol. 22, No. 3, 14 pages (2014).
Li et al., Using stochastic computing to reduce the hardware requirements for a restricted boltzmann machine classifier. in FPGA 2016—Proceedings of the 2016 ACM/SIGDA International Symposium on Field-Programmable Gate Arrays, 6 pages (2016).
Liu et al. "Computing hyperbolic tangent and sigmoid functions using stochastic logic," in Proc. 50th Asilomar Conf. Signals, Syst. Comput., pp. 1580-1585 (2016).
Lv et al., "A single magnetic-tunnel-junction stochastic computing unit," 2017 IEEE International Electron Devices Meeting (IEDM), San Francisco, CA, 4 pages (2017).

(56) References Cited

OTHER PUBLICATIONS

Lv et al., Experimental Demonstration of Probabilistic Spin Logic by Magnetic Tunnel Junctions. IEEE Magnetics Letters 10, 5 pages (2019).

Macri, AMD's next generation GPU and high bandwidth memory architecture: FURY. in 2015 IEEE Hot Chips 27 Symposium, HCS 2015, 26 pages (2016).

McDonnell et al., The benefits of noise in neural systems: Bridging theory and experiment. Nature Reviews Neuroscience vol. 12, pp. 415-425 (2011).

Mizrahi et al., Neural-like computing with populations of superparamagnetic basis functions. Nature Communications 9, 11 pages (2018).

Mondal et al., A. Energy-efficient design of MTJ-based neural networks with stochastic computing. ACM Journal on Emerging Technologies in Computing Systems, vol. 16, No. 1, 27 pages (2019).

Najafi et al., "A fast fault-tolerant architecture for Sauvola local image thresholding algorithm using stochastic computing," IEEE Transactions on Very Large Scale Integration (VLSI) Systems, vol. 24, No. 2, pp. 808-812 (2016).

Naviner et al., "Stochastic computation with spin torque transfer magnetic tunnel junction," in Proc. IEEE 13th Int. New Circuits Syst. Conf. (NEWCAS), 4 pages (2015).

Onizawa et al, "Analog-to-Stochastic Converter Using Magnetic Tunnel Junction Devices for Vision Chips", IEEE Trans. Nanotechnol., vol. 15, No. 5, pp. 705-714 (2016).

Oosawa et al, "Design of an STT-MTJ Based True Random Number Generator Using Digitally Controlled Probability-Locked Loop", IEEE 13th Int. New Circuits and Systems Conference (NEWCAS), pp. 1-4 (2015).

Parks et al., "Superparamagnetic perpendicular magnetic tunnel junctions for true random number generators," AIP Adv., vol. 8, No. 5, Art. No. 055903 (2018).

Pawlowski, Hybrid memory cube (HMC). in 2011 IEEE Hot Chips 23 Symposium, HCS 2011 (2016).

Qian et al, "An Architecture for Fault-Tolerant Computation with Stochastic Logic", IEEE Trans. Computers, vol. 60, No. 1, pp. 93-105 (2011).

Querlioz et al., "Bioinspired programming of memory devices for implementing an inference engine," Proc. IEEE, vol. 103, No. 8, pp. 1398-1416 (2015).

Raymenants et al, "Chain of magnetic tunnel junctions as a spintronic memristor", J. Appl. Phys., vol. 124, p. 152116 (2018).

Safranski et al., "Demonstration of nanosecond operation in stochastic magnetic tunnel junctions," Nano Lett., vol. 21, No. 5, pp. 2040-2045 (2021).

Schuman et al, "Opportunities for neuromorphic computing algorithms and applications," Nature Comput. Sci., vol. 2, No. 1, pp. 10-19 (2022).

Schuman et al., "A survey of neuromorphic computing and neural networks in hardware," (2017).

Sengupta et al, "Stochastic Inference and Learning Enabled by Magnetic Tunnel Junctions", 2018 IEEE International Electron Devices Meeting (IEDM), San Francisco, CA, pp. 15.6.1-15.6.4 (2018).

Sengupta et al., Encoding neural and synaptic functionalities in electron spin: A pathway to efficient neuromorphic computing. Applied Physics Reviews vol. 4 (2017).

Seshan, "Limits and hurdles to continued CMOS scaling," in Handbook of Thin Film Deposition, 4th ed. Norwich, Ny, USA: William Andrew, pp. 19-41 (2018).

Shao et al., "Implementation of artificial neural networks using magnetoresistive random-access memory-based stochastic computing units," IEEE Magn. Lett., vol. 12, pp. 1-5 (2021).

Sharad et al, "Ultra low energy analog image processing using spin based neurons", 2012 IEEE/ACM International Symposium on Nanoscale Architectures (NANOARCH), Amsterdam, pp. 211-217 (2012).

Srinivasan et al, "Magnetic Tunnel Junction Based Long-Term Short-Term Stochastic Synapse for a Spiking Neural Network with On-Chip STDP Learning", Scientific Reports, vol. 6, p. 29545 (2016).

Stein et al., Neuronal variability: Noise or part of the signal? Nature Reviews Neuroscience vol. 6 (2005).

Sutton et al., "Intrinsic optimization using stochastic nanomagnets", Scientific Reports, 7, p. 44370 (2017).

Vincent et al., "Spin-transfer torque magnetic memory as a stochastic memristive synapse for neuromorphic systems", IEEE Trans. Biomed. Circuits Syst., vol. 9, No. 2, pp. 166-174 (2015).

Zabihi et al, "In-Memory Processing on the Spintronic CRAM: From Hardware Design to Application Mapping", IEEE Trans. Computers, vol. 68, No. 8, pp. 1159-1173 (2019).

Zabihi et al., "Analyzing the effects of interconnect parasitics in the STT CRAM in-memory computational platform," IEEE J. Explor. Solid-State Comput. Devices Circuits, vol. 6, No. 1, pp. 71-79 (Jun. 2020).

Zabihi et al., "Using spin-Hall MTJs to build an energy efficient in-memory computation platform," in Proc. 20th Int. Symp. Quality Electron. Design (ISQED), pp. 52-57 (2019).

Zand et al., Low-Energy deep belief networks using intrinsic sigmoidal spintronic-based probabilistic neurons. in Proceedings of the ACM Great Lakes Symposium on VLSI, GLSVLSI (2018).

Zhang et al, "A simplified FPGA implementation of neural network algorithms integrated with stochastic theory for power electronics applications", 31st Annual Conference of IEEE Industrial Electronics Society (IECON), pp. 1018-1025, (2005).

Zhao et al., Low writing energy and sub nanosecond spin torque transfer switching of in-plane magnetic tunnel junction for spin torque transfer random access memory. in Journal of Applied Physics vol. 109 (2011).

Zhao et al., Spin-torque driven switching probability density function asymmetry. IEEE Transactions on Magnetics 48, (2012).

Zink et al., Independent Control of Antiparallel-and Parallel-State Thermal Stability Factors in Magnetic Tunnel Junctions for Telegraphic Signals with Two Degrees of Tunability. IEEE Transactions on Electron Devices 66, (2019).

Zink et al., Influence of Intrinsic Thermal Stability on Switching Rate and Tunability of Dual-Biased Magnetic Tunnel Junctions for Probabilistic Bits. IEEE Magnetics Letters 12, (2021).

Zink et al., Telegraphic switching signals by magnet tunnel junctions for neural spiking signals with high information capacity. Journal of Applied Physics 124, (2018).

* cited by examiner

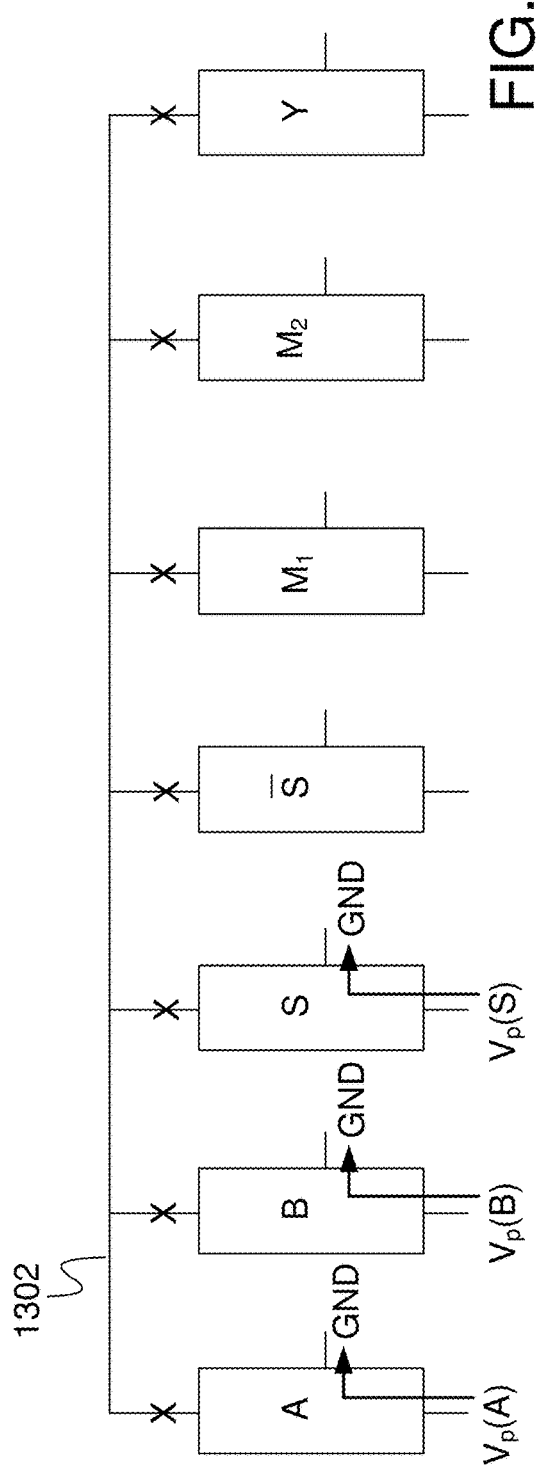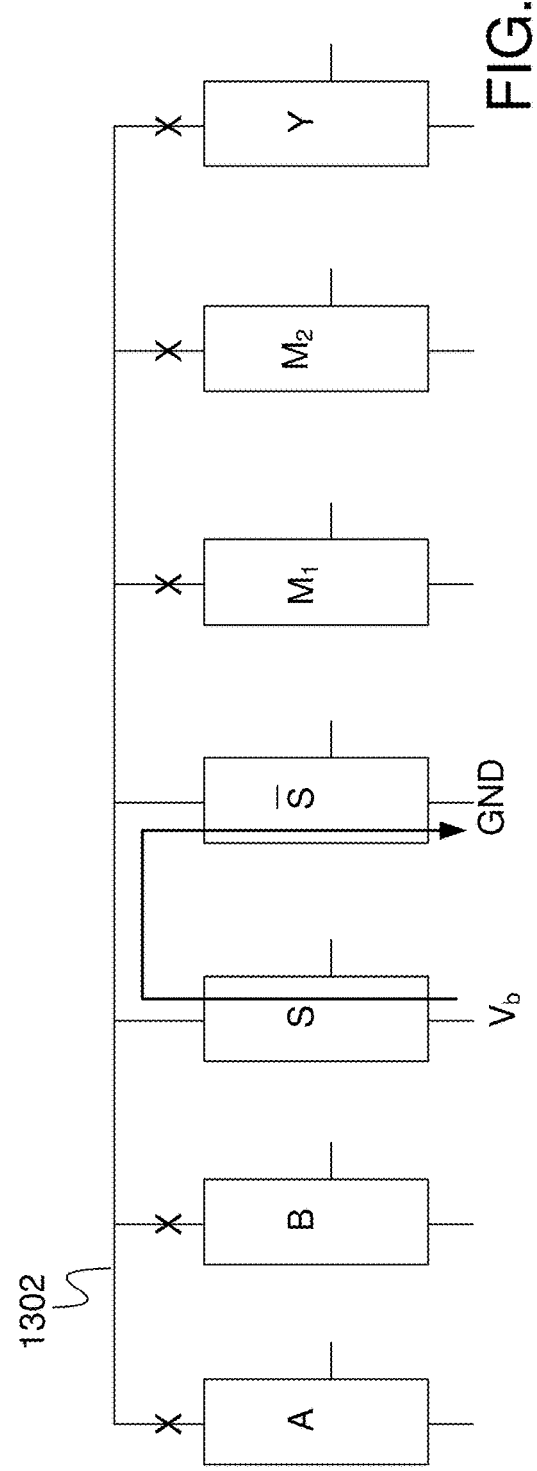

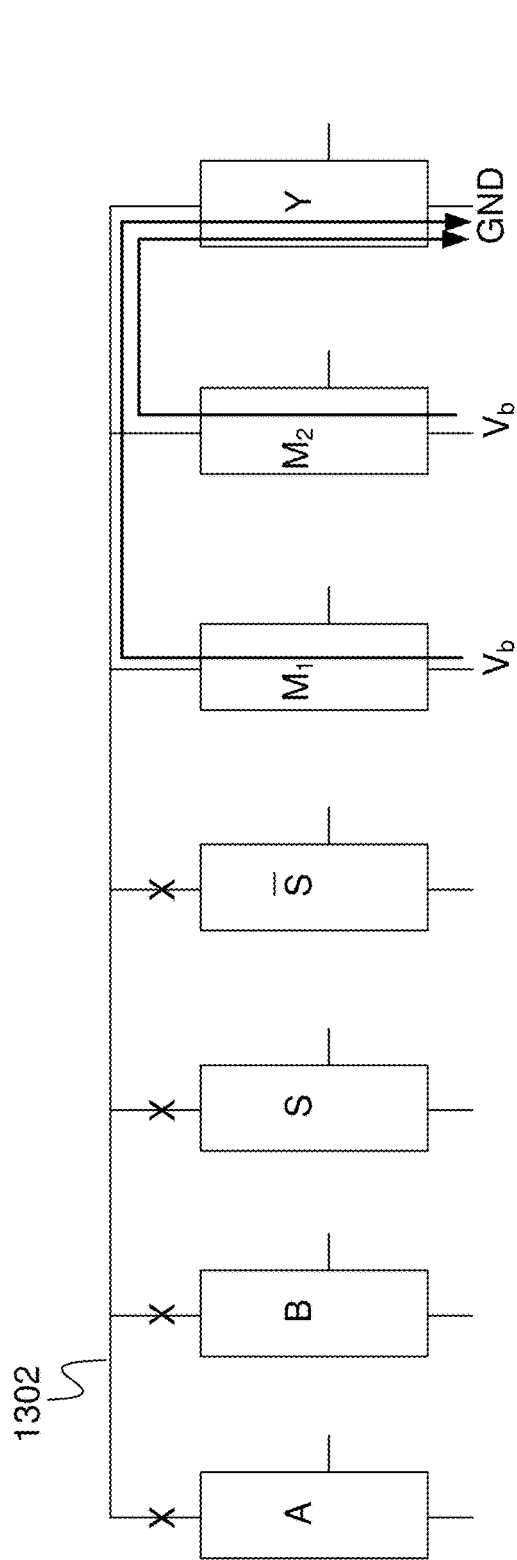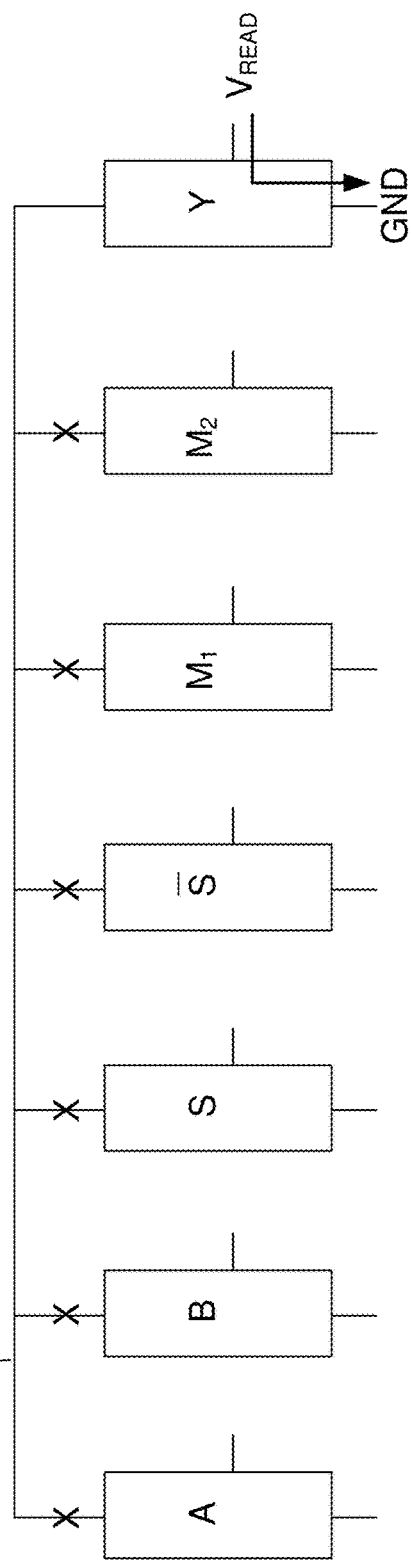

STOCHASTIC COMPUTING USING LOGIC-MEMORY CELLS

CROSS-REFERENCE TO RELATED APPLICATION

The present application is based on and claims the benefit of U.S. provisional patent application Ser. No. 63/373,392, filed Aug. 24, 2022, the content of which is hereby incorporated by reference in its entirety.

This invention was made with government support under FA8650-18-2-7868 awarded by the Air Force Materiel Command Legal Office. The government has certain rights in the invention.

BACKGROUND

In stochastic computing, data is encoded as streams of random bits. A logic circuit is constructed such that the numeric representation of the input value is represented as the percentage of "1" bits in the output stream. Although the percentage of "1" bits is controlled in the bit streams, the location of the "1" bits in the bit stream should be random.

The discussion above is merely provided for general background information and is not intended to be used as an aid in determining the scope of the claimed subject matter. The claimed subject matter is not limited to implementations that solve any or all disadvantages noted in the background.

SUMMARY

A circuit includes a first two-state device, a second two-state device and a third two-state device, each two-state device having a first resistance in a first state and a second resistance in a second state. First control elements are configured to apply a first voltage to the first two-state device to stochastically place the first two-state device in either the first state or the second state. Second control elements are configured to apply a second voltage to the second two-state device to stochastically place the second two-state device in either the first state or the second state. Third control elements are configured to send respective currents through the first two-state device and the second two-state device so as to place the third two-state device in either the first state or the second state based on the state of the first two-state device and the state of the second two-state devices.

In accordance with a further embodiment, a method includes applying a first pulse to a first device to randomly set a state of the first device and applying a second pulse to a second device to randomly set a state of the second device. The state of the first device and the state of the second device are used to set a state of a third device. The state of the third device is read to produce part of a stochastic bitstream.

In accordance with a further embodiment, a circuit includes control lines that during a first clock cycle apply a first input to a first circuit cell to cause the first circuit cell to be stochastically set to either a first state or a second state, apply a second input to a second circuit cell to cause the second circuit cell to be stochastically set to either the first state or the second state and apply a third input to a third circuit cell to cause the third circuit cell to be in the first state. During a second clock cycle, the control lines pass current from the first circuit cell and the second circuit cell through the third circuit cell so as to set the state of third circuit cell.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 15 shows the circuit of FIG. 13 during a second clock cycle of the stochastic scaled addition.

FIG. 16 shows the circuit of FIG. 13 during a third clock cycle of the stochastic scaled addition.

FIG. 19 shows the circuit of FIG. 13 during a sixth clock cycle of the stochastic scaled addition.

FIG. 20 shows the circuit of FIG. 13 during a seventh clock cycle of the stochastic scaled addition.

DETAILED DESCRIPTION

Stochastic computing is limited by the need to provide circuit elements that can generate random bit streams with a desired percentage of "1" bits. These additional circuit elements increase the size and power usage of the circuits used to perform the mathematical operation and are often more complex than the logic components in the circuits.

The embodiments described below use a logic-memory cell to generate a random bit stream with a desired percentage of 1's and to execute a logical operation using the random bit stream. This reduces the number of circuit elements needed to perform a mathematical operation using stochastic computing.

Figure 1:
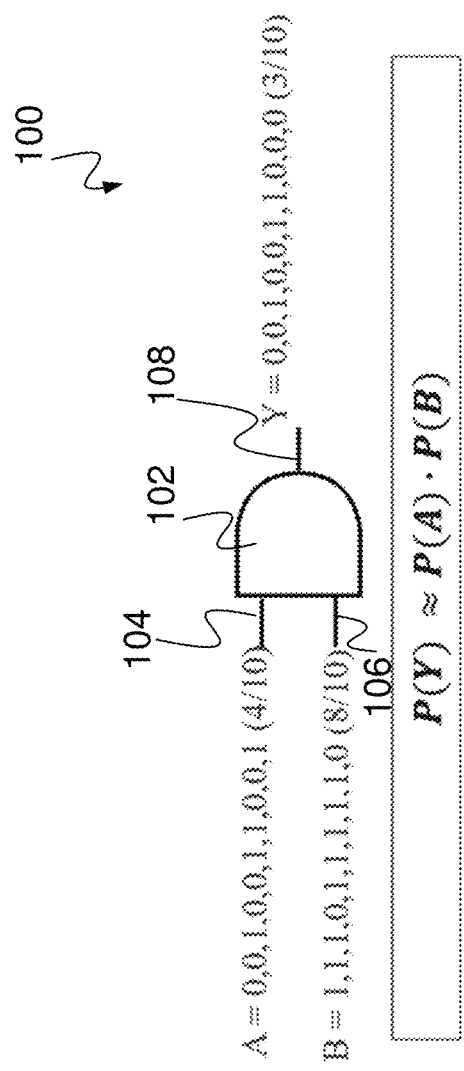
FIG. 1 is logic diagram of a circuit used to perform multiplication through stochastic computing.

FIG. 1 provides an example of a logic circuit 100 used to perform multiplication through stochastic computing. Logic circuit 100 includes a single AND gate 102 having two inputs 104 and 106 and one output 108. Input 104 receives a random bitstream A and input 106 receives a random bitstream B. Each bit in A is ANDed with a corresponding bit in B to form an output bitstream Y on output 108. The probability of a "1" occurring in output bitstream Y (also referred to as the percentage of 1's in Y), p(Y), is approximately equal to the probability of a "1" occurring in input bitstream A (also referred to as the percentage of 1's in A), p(A), times the probability of a "1" occurring in input bitstream B (also referred to as the percentage of 1's in B), p(B). For instance, in the example of FIG. 1, the probability of a "1" occurring in A is 0.4, the probability of "1" occurring in bitstream B is 0.8, and the probability of a "1" occurring in output bitstream Y is 0.3, which is approximately equal to 0.32, which is the product of 0.8 and 0.4.

As noted above, the present embodiments generate the input bitstreams and perform the logical operation using logic-memory cells. Such logic-memory cells are two-state devices that have a first resistance when in a first state and a second resistance when in a second state.

Figure 2:
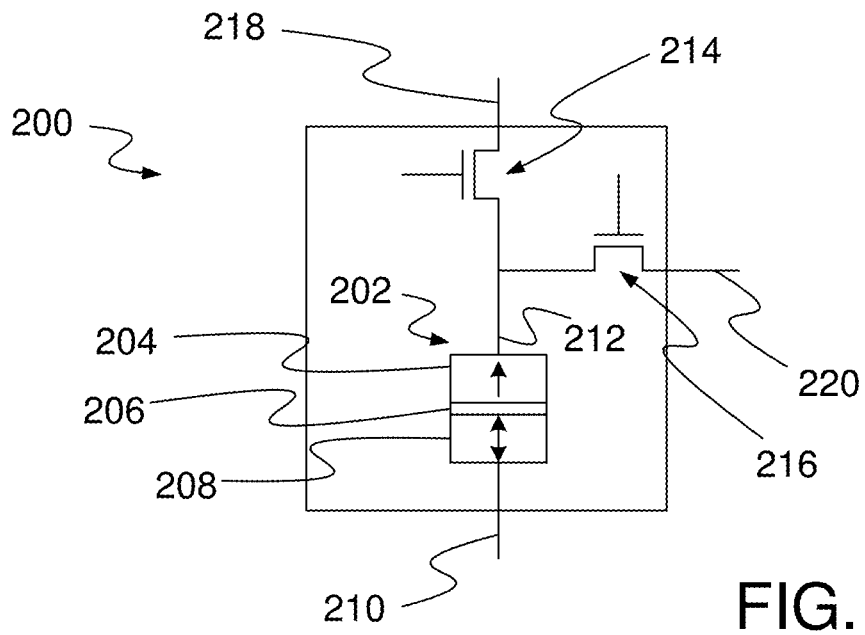
FIG. 2 is circuit diagram of a logic-memory cell in accordance with a first embodiment.

FIG. 2 provides one example of a logic-memory cell 200 that can be used in the various embodiments. Logic-memory cell 200 includes a magnetic tunneling junction (MTJ) 202 having a fixed layer 204, a tunnel barrier 206, and a free layer 208. When the relative magnetic orientations of layers 204 and 208 are parallel, magnetic tunneling junction 202 has a low resistance. When the relative magnetic orientations of layers 204 and 208 are anti-parallel, magnetic tunneling junction 202 has a high resistance. The magnetic orientation of free layer 208 can be definitively set by passing a current through magnetic tunneling junction 202 that is larger than a threshold amplitude. Current greater than the threshold passed in one direction will definitively set the orientation of free layer 208 parallel to fixed layer 204 while current greater than the threshold passed in the other direction will definitively set the magnetic orientation anti-parallel to the orientation of fixed layer 204. Magnetic tunneling junction 202 has two conductors 210 and 212 that are used to pass current through magnetic tunneling junction 202 to either determine the resistance of magnetic tunneling junction 202 and thus read the values stored in magnetic tunneling junction 202, or to set the magnetic orientation of free layer 208 to thereby write a value to magnetic tunneling junction 202.

In the embodiment shown in FIG. 2, conductor 212 is connected to switching transistors 214 and 216. Switching transistor 214 allows conductor 212 to be connected to a logic conductor 218 discussed further below. Switching transistor 216 allows conductor 212 to be connected to an individual read/write conductor 220 as discussed further below. Conductor 210 acts as a read/write control conductor.

Figure 3:
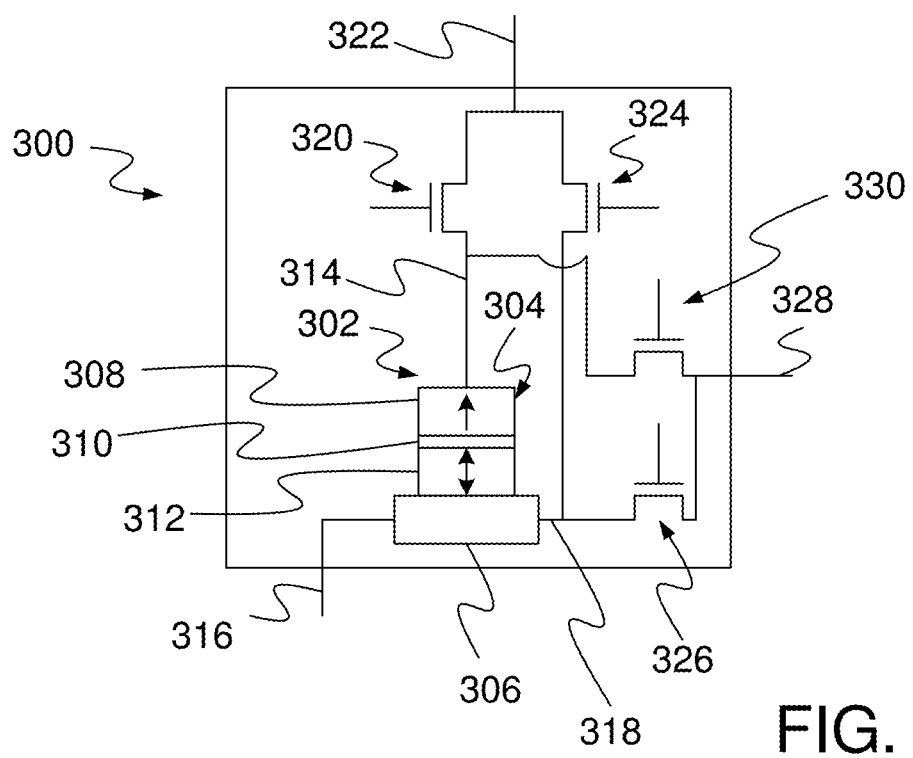
FIG. 3 is circuit diagram of a logic-memory cell in accordance with a second embodiment.

FIG. 3 provides an example of an alternative logic-memory cell 300 that can be utilized in the embodiments described below. Logic-memory cell 300 includes a three-terminal magnetic tunnel junction 302, whose write mechanism is based on spin-orbit torque such as the spin-Hall effect (SHE). In the discussion below, spin-Hall effect (SHE) is referenced but the embodiments described below may be implemented using any spin-orbit torque system that changes the resistance of a magnetic tunneling junction using a current that does not pass through the magnetic tunneling junction itself. For simplicity, SHE-CRAM (spin-Hall effect computational random access memory) and SHE-MTJ have been used in the discussion below but these terms can be replaced with SOT-CRAM (spin-orbit torque-CRAM) or SOT-MTJ with equal effect.

The three-terminal magnetic tunneling junction 302 consists of a magnetic tunneling junction 304 seated on a spin-Hall channel 306. The magnetic tunneling junction includes a fixed layer 308, a tunnel barrier 310 and a free layer 312 between the tunnel barrier 310 and the spin-Hall channel 306. A first terminal 314 is connected to fixed layer 308, a second terminal 316 is connected to one end of spin-Hall channel 306, and a third terminal 318 is connected to a second end of spin-Hall channel 306. When the magnetic orientation of free layer 312 is parallel to the magnetic orientation of fixed layer 308, SHE-MTJ 302 has a lower resistance for current flows across tunnel barrier 310 than when the magnetic orientation of free layer 312 is anti-parallel to the magnetic orientation of fixed layer 308. The resistance state of SHE-MJT 302 can be determined by passing a current between terminals 314 and 316.

The orientation of the magnetic moment of free layer 312 can be definitively switched by passing a current of sufficient amplitude through spin-Hall channel 306 (between terminals 316 and 318). In particular, passing a current that exceeds a threshold current density in a first direction through spin-Hall channel 306 will set the orientation of the magnetic moment of free layer 312 in a first direction while passing current that exceeds the threshold current density in a second direction through spin-Hall channel 306 sets the orientation of the magnetic moment of free layer 312 in an opposite direction.

Terminal 314 is connected to a switching transistor 320 that is further connected to a logic conductor 322. When logic-memory cell 300 is used as input to a logical operation, a switching control signal causes switching transistor 320 to connect terminal 314 to logic conductor 322 to allow a read current to pass from terminal 316, through SHE-MTJ 302, terminal 314 and switching transistor 320 to logic conductor 322. Logic-memory cell 300 also includes a switching transistor 324 that is connected between terminal 318 and logic conductor 322. When logic-memory cell 300 is to be written to during a logic operation, a switching control signal causes switching transistor 320 to connect terminal 318 to logic conductor 322 to allow a write current to flow from logic conductor 322, through switching transistor 324, terminal 318 and spin-Hall channel 306 to terminal 316. Logic-memory cell 300 further includes a switching transistor 326 between terminal 318 and an individual read/write conductor 328 to allow magnetic tunneling junction 302 to be set or reset to a particular value before a logical operation takes place. In particular, during a set/reset operation, a switching control signal causes switching transistor 326 to connect terminal 318 to individual read/write conductor 328 and a current is passed between individual read/write conductor 328 and terminal 316 through spin-Hall channel 306. Logic-memory cell 300 also includes a switching transistor 330 between terminal 314 and individual read/write conductor 328 to allow the value stored in magnetic tunneling junction 302 to be read. During such read operations, a switching control signal causes switching transistor 330 to connect terminal 314 to individual read/write conductor 328 so that a read current can be passed from individual read/write conductor 328, through switching transistor 330, SHE-MTJ 302, to terminal 316. In the discussion below, terminal 316 is referred to as a read/write control conductor.

Figure 4:
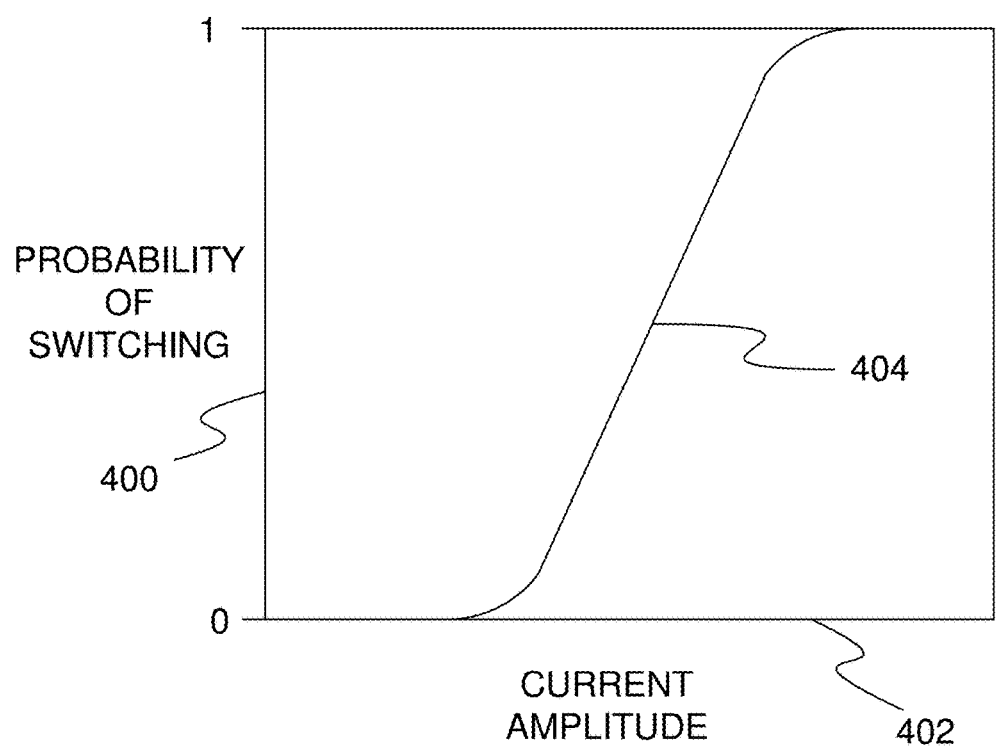
FIG. 4 is graph of switching probability as a function of current amplitude.

As noted above, the orientation of the free layers of magnetic tunneling junctions 202 and 302 can be definitively changed using a write current that exceeds a threshold amplitude. Some currents below the threshold are also able to change the orientation of the free layer but do so stochastically. FIG. 4 provides a graph 404 of switching probabilities along vertical axis 400 as a function of current amplitude shown along horizontal axis 402 for a write current pulse lasting ten nanoseconds. As shown by graph 404, at low current amplitudes, the probability of the free layer switching orientations is 0%. At some amplitude, the probability of switching begins to increase with increasing amplitude until reaching 100% at the threshold current.

Thus, by selecting the amplitude of a current applied to the logic-memory cell during a write operation, it is possible to select the probability of switching the orientation of the free magnetic layer. In other words, the logic-memory cell is a tunable random number generator. For example, a current amplitude can be selected that is associated with a 0.4 probability of switching the orientation of the free layer. Each time such a current is applied there is a 40% chance that the free layer will switch orientation.

The state of the free layer in a logic-memory cell can be associated with a bit value of "1" or "0". For example, when the free layer is parallel to the fixed layer, the logic-memory cell can be described as being set to a value of "0" or holding a value of "0" while when the free layer is anti-parallel to the fixed layer, the logic-memory cell can be described as being set to a value of "1" or holding a value of "1". Further, a value of "0" can be "written" to logic-memory cell by applying a current that sets the magnetic orientation of the free layer so that it is parallel to the magnetic orientation of the fixed layer and a value of "1" can be "written" to the logic-memory cell by applying a current that sets the magnetic orientation of the free layer so that it is antiparallel to the magnetic orientation of the fixed layer. The binary value stored in logic-memory cell can be read by applying a voltage to the logic-memory cell and using the resulting current from the logic-memory cell as an indication of the binary value. In particular, a larger current indicates a binary value of "0" and a smaller current indicates a binary value of "1". Those skilled in the art will recognizing that the mapping of "0" and "1" to parallel and antiparallel is arbitrary and an opposite mapping can be used.

A random bitstream can be generated within a magnetic tunneling junction by repeatedly alternating between definitively setting the magnetic tunneling junction to a particular value using a current that exceeds the threshold current and stochastically changing that value by applying a smaller current in the opposite direction that may or may not switch the orientation of the free layer. With each cycle of resetting and then stochastically setting the orientation of the free layer, a random bit value is set where the probability of that bit value being a 1 is determined by the current amplitude applied during the stochastic changing step.

Figure 5:
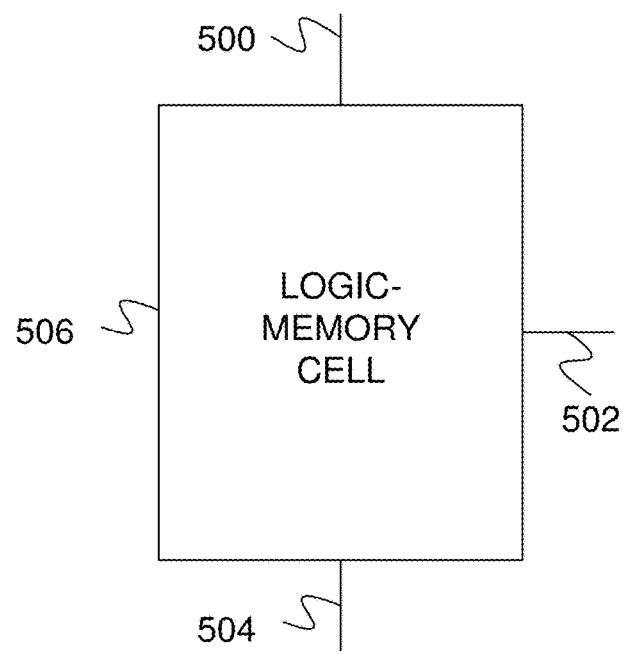
FIG. 5 is a simplified representation of a logic-memory cell.

FIG. 5 provides a simplified block diagram representation of the logic-memory cells of FIGS. 2 and 3. In FIG. 5, a logic-memory cell includes a logic conductor 500 corresponding to logic conductors 218 and 322 in FIGS. 2 and 3; individual read/write conductor 502 corresponding to individual read/write conductors 220 and 328 of FIGS. 2 and 3; and read/write control conductor 504 representing read/write control conductors 210 and 316 of FIGS. 2 and 3. The switching transistors and the magnetic tunneling junctions of FIGS. 2 and 3 are embodied within the logic-memory cell block 506. Additional conductors for providing the switching control signals to the switching transistors are not shown for simplicity but those skilled in the art will recognize that such conductors are present.

The logic-memory cells of FIGS. 2 and 3 can be connected together to implement a number of logic operations including: NOT, NAND, AND, NOR, OR, MAJ3 and MAJ5. For the NOT operation, the logic conductors of two logic-memory cells are connected to each other by a logic line. One of the logic-memory cells acts as an input to the operation and one logic-memory cell holds the output of the operation. For the NAND, AND, NOR and OR operations, the logic conductors of three logic-memory cells are connected to each other by a logic line with two of the logic-memory cells acting as inputs to the operation and one logic-memory cell holding the output of the operation.

In an alternative construction for OR operations, NOT operations are performed on the respective inputs and the outputs of the NOT operations are fed as inputs to a NAND operation. In such constructions, two logic-memory cells are used for one of the NOT operations and two other logic-memory cells are used for the other NOT operation as discussed above. The logic-memory cells that hold the output of the NOT operations are further connected to a fifth logic-memory cell that holds the output of the NAND operation. The NOT operations are performed first to set the logic-memory cells that hold the outputs of the NOT operations. These memory cells are then used as inputs for the NAND operation. It has been found that such a construction for the OR operation maximizes the noise margin.

In an alternative construction for OR operations, a NAND operation is performed on the inputs first and then a NOT operation is performed on the output of the NAND operation. The NAND operation is performed using three logic-memory cells as discussed above. The logic-memory cell holding the output of the NAND operation is further connected to a fourth logic-memory cell which holds the output of the NOT operation. The NAND operation is performed first to set the logic-memory cell that holds the output of the NAND operation. The output memory cell of the NAND operation is then used as the input for the NOT operation. It has been found that such a construction for an AND operation maximizes the noise margin.

For the MAJ3 operation, the logic conductors of four logic-memory cells are connected to each other by a logic line with three logic-memory cells acting as inputs and one logic-memory cell holding the output of the operation. For MAJ5 operation, the logic conductors of six logic-memory cells are connected to each other by a logic line with five logic-memory cells acting as inputs and one logic-memory cell holding the output of the operation.

Figure 6:
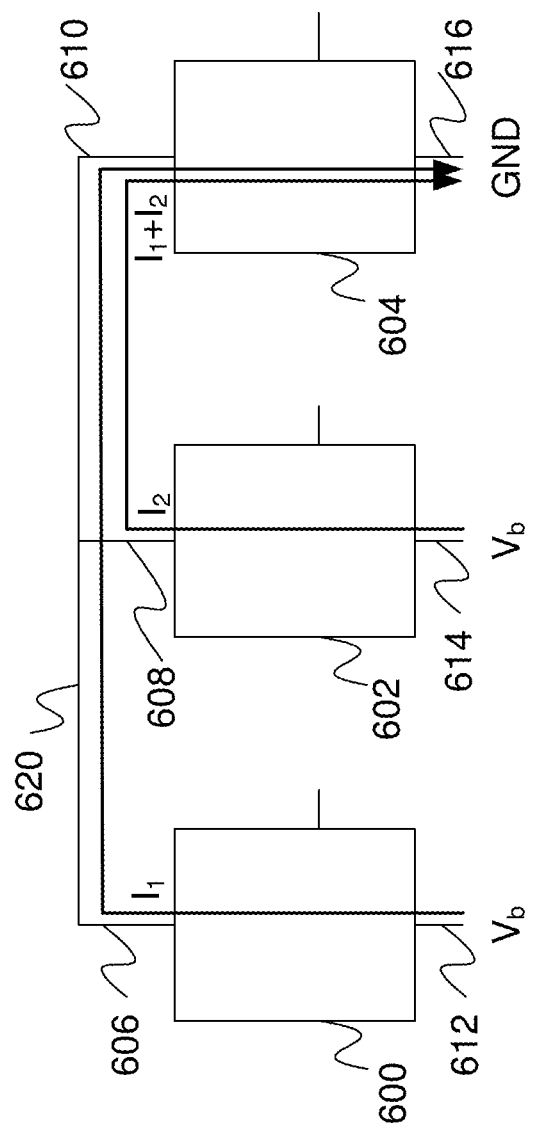
FIG. 6 is a simplified circuit diagram of an AND gate implemented using logic-memory cells.

FIG. 6 provides an example of three logic-memory cells connected together for implementing NAND, AND, NOR or OR operations. In FIG. 6, logic-memory cells 600 and 602 act as inputs to the logic operation and logic-memory cell 604 holds the output value of the logic operation. The logic conductors 606, 608 and 610 of logic-memory cells 600, 602 and 604 are connected together by a logic line 620. The state of logic-memory cells 600 and 602 is set by altering the magnetic orientation of the magnetic free layer in the logic-memory cells 600 and 602 to represent the input for the logical operation. The state of logic-memory cell 604 is initially set dependent on the operation to be performed. For example, for a NAND operation, output logic-memory cell 604 would be set to 0 and for an AND operation, output logic-memory cell 604 would be set to 1. Similarly, for a NOR operation, output logic-memory cell 604 would be set to 0 and for an OR operation, output logic-memory cell 604 would be set to a 1.

After the input and output logic-memory cells have been set, a bias voltage is applied to read/write control conductors 612 and 614 of input logic-memory cells 600 and 602, respectively, to cause a current $I_1$ to flow through input logic-memory cell 600, a current $I_2$ to flow through input logic-memory cell 602 and a current $I_1+I_2$ to flow through output logic-memory cell 604. The size of the bias voltage $V_b$ applied at read/write control terminals 612 and 614 determines whether a NAND/AND or a NOR/OR operation is being performed. Depending on the states of input logic-memory cell 600 and 602, voltage $V_b$ will result in a total current $I_1+I_2$ that is either sufficient or insufficient to change the state of output logic-memory cell 604. In other words, the amplitude of the current will either be large enough to change the state of output logic-memory cell 604 with 100% probability or will be so small that it has a 0% probability of switching the state of output logic-memory cell 604.

As noted above for FIG. 1, stochastic computations can be formed using logic gates. Under the present embodiments, the logic gates in stochastic computations are implemented using logic-memory cells where the state of the input logic-memory cells is set stochastically. As a result, the input logic memory cells both provide a random value for the input and help to execute the logic operation.

Figure 7:
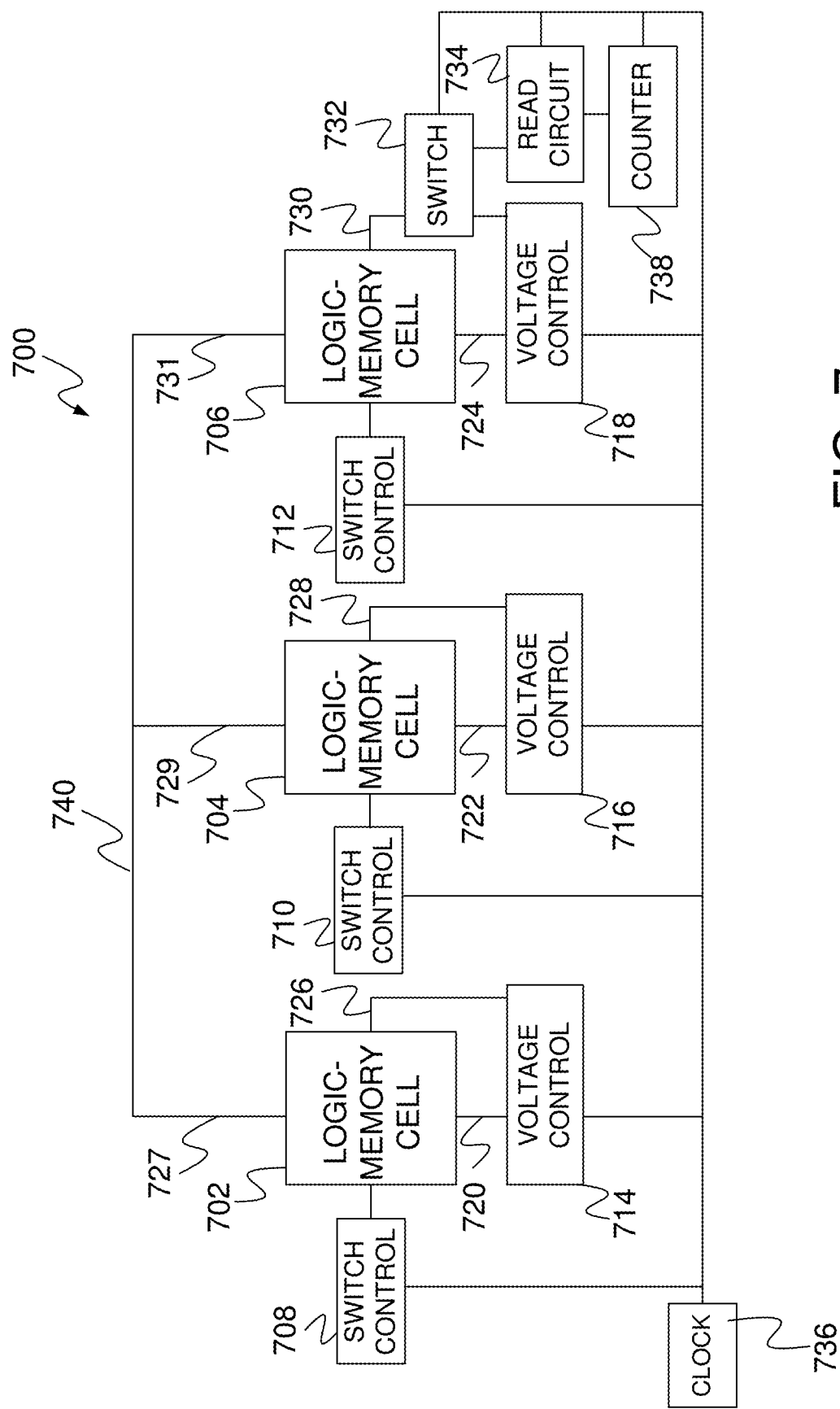
FIG. 7 is a diagram of a circuit for performing stochastic computing using logic-memory cells.

FIG. 7 provides block diagram of a stochastic multiplier circuit 700 in which logic-memory cells are used to provide the random inputs and perform the AND operation shown in FIG. 1. In FIG. 7, logic-memory cell 702 and logic-memory cell 704 operates as tunable random number generators that provide random bitstreams with tunable probabilities to logic-memory cell 706, which holds the output of the AND operations performed on each bit on input bitstreams. Logic memory cells 702, 704 and 706 have respective logic conductors 727, 729 and 731 that are each connected to a logic line 740. Logic memory cells 702, 704 and 706 also have respective read/write control conductors 720, 722 and 724 and individual read/write conductors 726, 728 and 730.

For each logic-memory cell, there is a respective switch control, such as switch controls 708, 710 and 712, which control the internal switching transistors within the logic-memory cells through control lines between the switch controls and the gates of the switching transistors. In addition, for each logic-memory cell there is an associated voltage control, such as voltage controls 714, 716 and 718, which control the voltages applied to the read/write control conductors 720, 722 and 724 and/or the individual read/write conductors 726, 728 and 730 through control lines between the voltage controls and those conductors. There is an additional switch 732 connected between individual read/write conductor 730 of logic memory cell 706, voltage control 718 and a read circuit 734. Switch 732 controls whether individual read/write control is connected to voltage control 718 or to read circuit 734. A clock 736 is connected to each switch control 708, 710 and 712, each voltage control 714, 716 and 718, switch 732, read circuit 734 and a counter 738. Clock 736 generates a clock signal that synchronizes the operations of the various components connected to clock 736. Read circuit 734 is also connected to counter 738. Switch controls 708, 710, and 712, voltage controls 714, 716, and 718, switch 732 and read circuit 734 are each referred to as a control element.

FIGS. 8-11 depict the states of logic-memory cells 702, 704 and 706 for respective clock cycles of clock 736 during a stochastic multiplication. In particular, the states shown in FIGS. 8-11 are for four clock cycles used to process one bit in the bitstream. For simplicity, the switching controls, voltage controls, read circuit, counter and clock are not shown in FIGS. 8-11 but those skilled in the art will recognize that some of those components are used to place the logic-memory cells in the depicted states.

Figure 8:
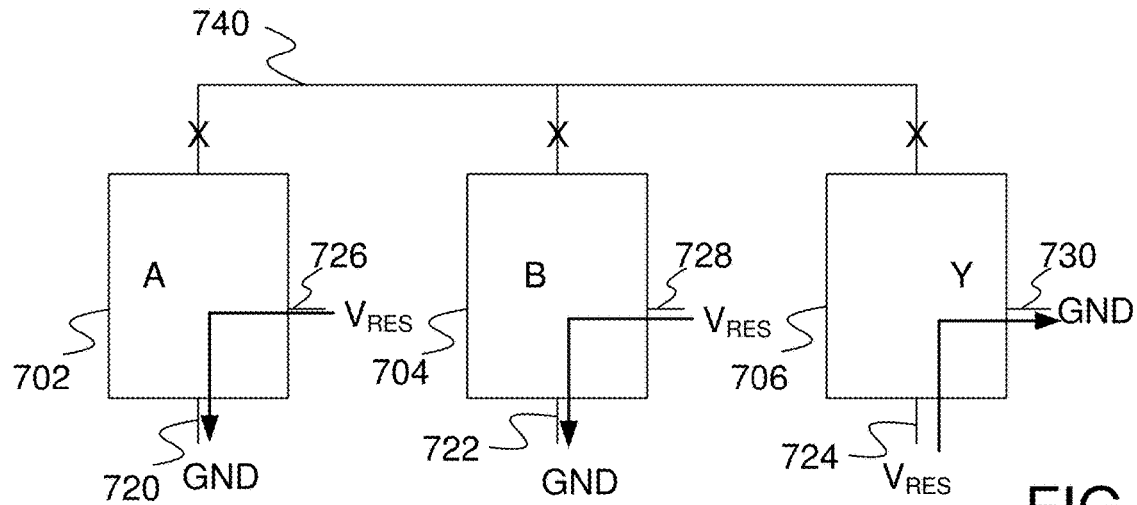
FIG. 8 is a simplified diagram of the circuit of FIG. 7 during a first clock cycle.

In FIG. 8, switch controls 708, 710 and 712 cause each of the logic memory cells to be disconnected from common logic line 740 as indicated by the Xs at the top of the logic-memory cells. Switch controls 708, 710 and 712 also cause individual read/write conductors 726, 728 and 730 of the logic-memory cells to be connected to the respective voltage controls 714, 716 and 718. Voltage controls 714, 716 and 718 apply a ground voltage to read/write control conductors 720 and 722 of input logic-memory cells 702 and 704 and a reset voltage to individual read/write conductors 726 and 728 of input logic-memory cells 702 and 704. This causes a reset current to pass through logic-memory cells 702 and 704 setting those memory cells to a digital value of 0. Voltage control 718 applies the reset voltage to read/write control conductor 724 of output logic-memory cell 706 and a ground voltage to individual read/write conductor 730 to set output logic-memory cell 706 to a value of 1.

Figure 9:
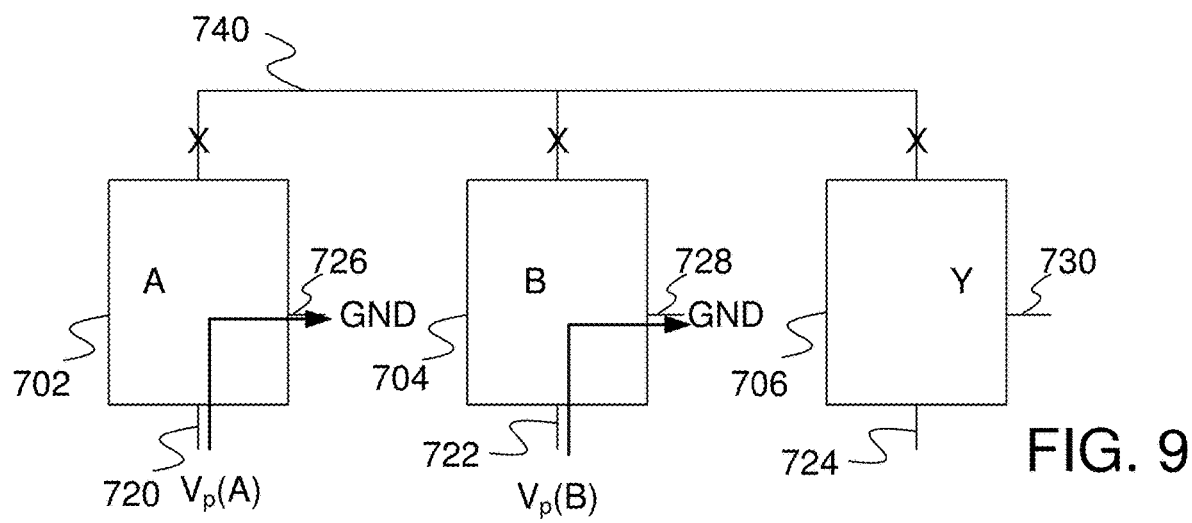
FIG. 9 is a simplified diagram of the circuit of FIG. 7 during a second clock cycle.

In FIG. 9, input logic-memory cells 702 and 704 are randomly set to a respective state by having voltage control 714 apply a voltage pulse of amplitude $V_p(A)$ to read/write control conductor 720 of logic-memory cell 702 and by having voltage control 716 apply a voltage pulse of amplitude $V_p(B)$ to read/write control conductor 722 of logic-memory cell 704. The respective amplitudes of the voltages determines the current amplitude passing through logic-memory cells 702 and 704 and thereby determines the probability that the logic-memory cell will switch to a value of 1. Thus, the voltages applied in FIG. 9 randomly set the states of logic-memory cells 702 and 704 but do so with a selected probability.

Figure 10:
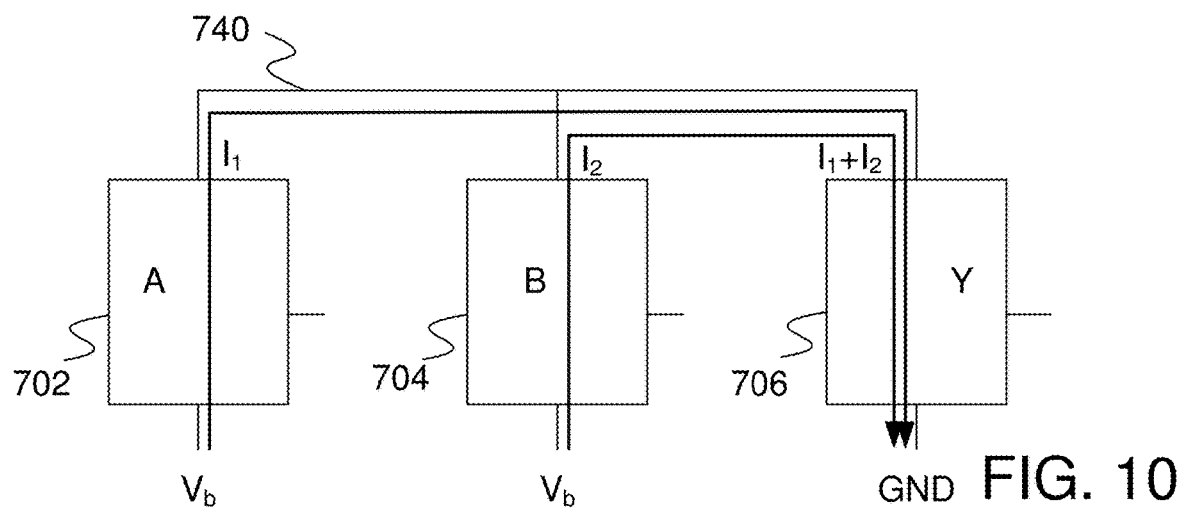
FIG. 10 is a simplified diagram of the circuit of FIG. 7 during a third clock cycle.

After input logic-memory cells 702 and 704 have been randomly set to their input states, switch controls 708, 710 and 712 connect logic-memory cells 702, 704 and 706 to common logic line 740 as shown in FIG. 10. At the same time, voltage controls 714 and 716 apply a bias voltage $V_b$ to the read/write control conductors 720 and 722 of input logic-memory cells 702 and 704. Voltage control 718 applies ground to read/write control conductor 724 of output logic-memory cell 706. These voltages cause current to flow through both logic-memory cell 702 and logic-memory cell 704 and into output logic-memory cell 706 such that both of the currents from input logic-memory cells 702 and 704 pass through output logic-memory cell 706. The bias voltage $V_b$ is selected such that the current passing through output logic-memory cell 706 deterministically sets the state of output logic-memory cell 706. Thus, the total current either exceeds the threshold current or changing the state of logic-memory cell 706 with 100% probability or the total current has 0% probability of switching the state of logic-memory cell 706. In addition, the bias voltage is selected so that the state of output logic-memory cell 706 will only stay "1" if both of input logic-memory cells 702 and 704 have a value of "1", thereby implementing the logic AND operation. If either input logic-memory cell 702 or input-logic memory cell 704 is a "0", the total current passing through output logic-memory cell 706 will exceed the threshold current and will cause output logic-memory cell 706 to switch to "0".

Figure 11:
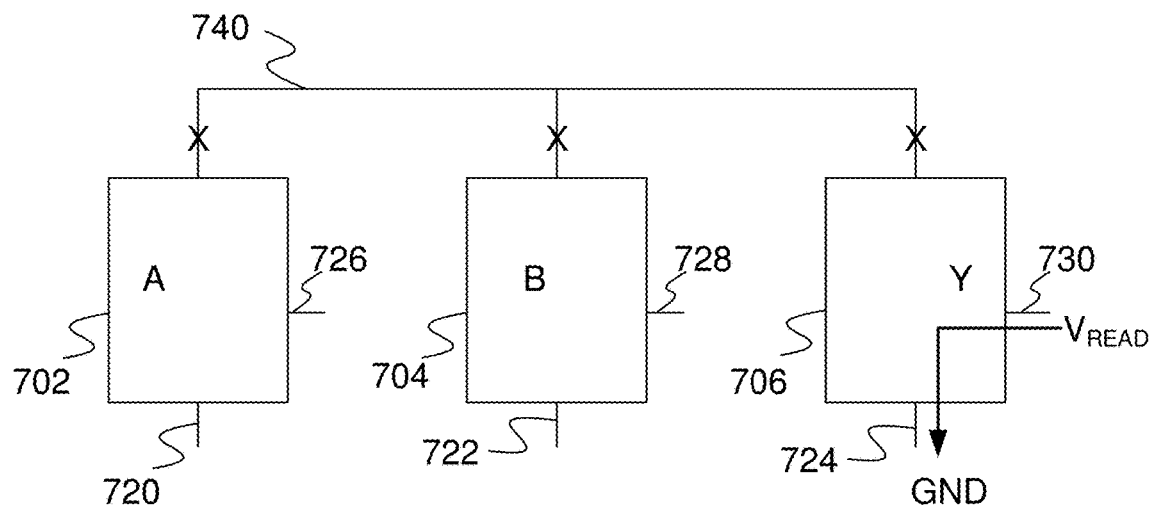
FIG. 11 is a simplified diagram of the circuit of FIG. 7 during a fourth clock cycle.

After the logic operation is complete, switch controls 708, 710 and 712 once again disconnect logic-memory cells 702, 704 and 706 from common logic line 740 as shown in FIG. 11. Switch 732 then connects individual read/write conductor 730 of output logic-memory cell 706 to read circuit 734. Read circuit 734 then applies a read voltage V READ to individual read/write conductor 730 while voltage control 718 applies ground to read/write control conductor 724. Read circuit 734 measures the resistance provided by logic-memory cell 706 to determine the state of logic-memory cell 706. When the state is "1", read circuit 734 increments counter 738. When the state is "0", read circuit 734 does not increment counter 738.

The clock cycles of FIGS. 8-11 are repeated for each bit in the random bitstream. This results in a series of clock cycles for resetting the logic-memory cells (FIG. 8), a series of clock cycles for randomly setting the input logic-memory cells (FIG. 9), a series of clock cycles for using the randomly set input values to write to the output logic-memory cell (FIG. 10) and a series of clock cycles for reading the value stored in the output logic-memory cell (FIG. 11). Each of the four series of clock cycles are interspersed between the other series of clock cycles.

The accuracy of the stochastic computation increases with the number of bits in the bitstream and the total number of bits in the bitstream is selected based on a desired accuracy for the calculation. When the desired number of bits have been processed, the ratio of the count in counter 738 to the total number of bits in the bitstream represents the result of the calculation.

Figure 12:
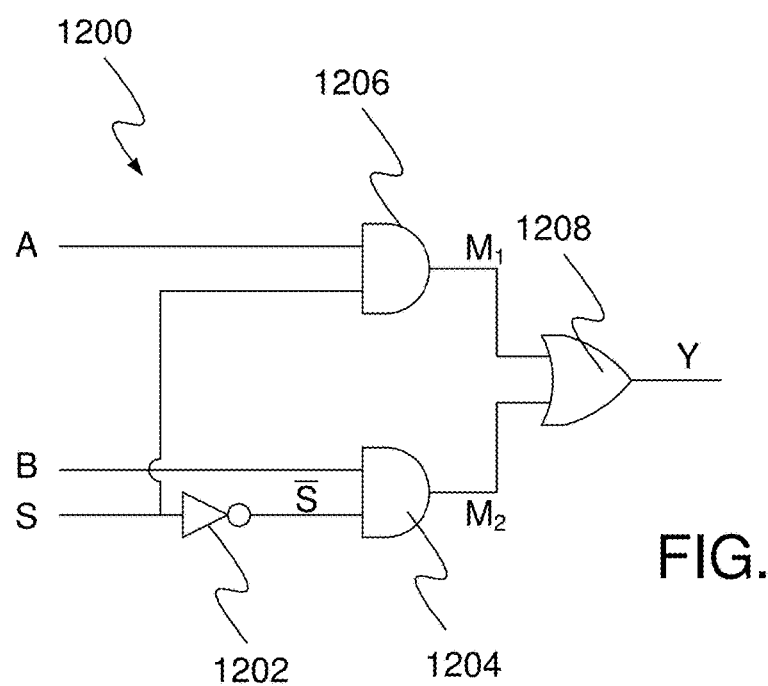
FIG. 12 is circuit diagram of a logic circuit used to perform stochastic scaled addition.

The present embodiments can also implement scaled addition using a logic gate implementation of a multiplexer as shown in FIG. 12. By applying random bitstreams to inputs A and B as well as to select input S, the percentage of is in the output Y, P(Y), will correspond to the function $P(S)*P(A) \pm (1-P(S))*P(B)$, where P(S) is the percentage of is in select input bitstream S, P(A) is the percentage of is in input bitstream A and P(B) is the percentage of is in input bitstream B.

Logic gate circuit 1200 of FIG. 12 includes a NOT gate 1202, two AND gates 1204 and 1206 and an OR gate 1208. Select input bitstream S is provided to NOT gate 1202, which produces g, the inverse of S. S and input bitstream A are provided to AND gate 1204, which produces $M_1$ at its output. S and input bitstream B are provided to AND gate 1206, which produces $M_2$ at its output. $M_1$ and $M_2$ are provided to OR gate 1208, which produces Y at its output.

Figure 13:
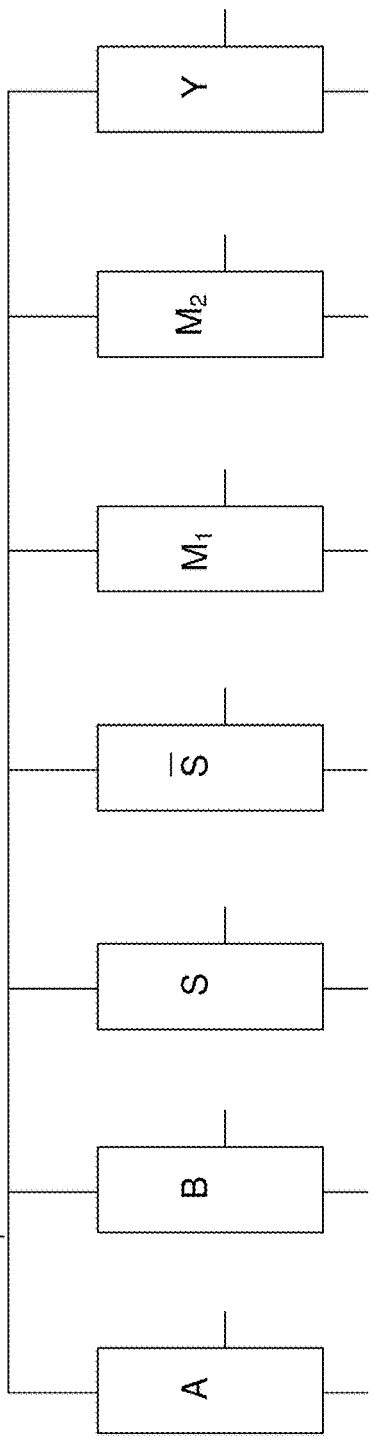
FIG. 13 is a simplified diagram of a circuit using logic-memory cells to implement the logic circuit of FIG. 12.

FIG. 13 shows an implementation of circuit 1200 using logic-memory cells in accordance with the present embodiment. In FIG. 13, the logic-memory cells are denoted by the values they provide in FIG. 12. In FIG. 13, a simplified depiction of the implementation is provided. Like the depictions shown in FIGS. 8-11 for the AND circuit of FIG. 7, FIG. 13 omits the switch control and voltage control for each logic-memory cell; the switch, read circuit and counter connected to output logic-memory cell Y, and the clock. Those skilled in the art will recognize that those components are present in the implementation but are not depicted for the sake of simplifying the figures.

FIGS. 14-20 depict the states of the logic-memory cells of FIG. 13 when executing a stochastic scaled addition. In particular, the states shown in FIGS. 14-20 are used to process one bit in the bitstream.

Figure 14:
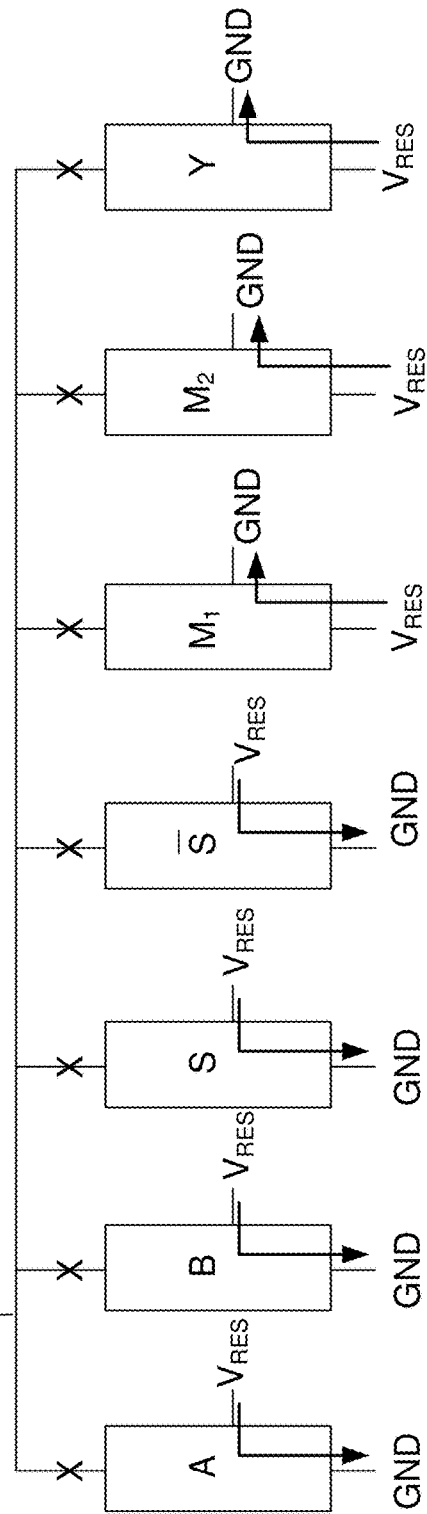
FIG. 14 shows the circuit of FIG. 13 during a first clock cycle of the stochastic scaled addition.

In FIG. 14, all of the logic-memory cells are disconnected from a common logic line 1302 and each of the logic-memory cells are set to their initial values by applying a voltage between the read/write control conductor and the individual read/write conductor of each logic-memory cell.

As shown in FIG. 15, voltage pulses are then applied to logic-memory cells A, B and S to randomly set the states of A, B and S. The amplitude of the voltage pulses $V_p(A)$, $V_p(B)$, $V_p(S)$ determines the probability that the state of these logic-memory cells will change due to the pulse. Note that different voltages can be used for different logic-memory cells to achieve different probabilities for the different inputs. After the pulse has been applied, logic-memory cells A, B and S contain the input values for the multiplexer.

As shown in FIG. 16 after the input values have been set, logic-memory cells S and $\overline{S}$ are connected to common logic line 1302 and voltages are applied to logic-memory cells S and $\overline{S}$ to cause a current to flow through logic-memory cell S, along common logic line 1302 and through logic-memory cell $\overline{S}$. The voltage applied between the read/write control conductors of S and $\overline{S}$ is selected to implement NOT gate 1202 of FIG. 12. As a result, after the steps shown in FIG. 16, logic-memory cell $\overline{S}$ has the opposite state from logic-memory cell S.

Figure 17:
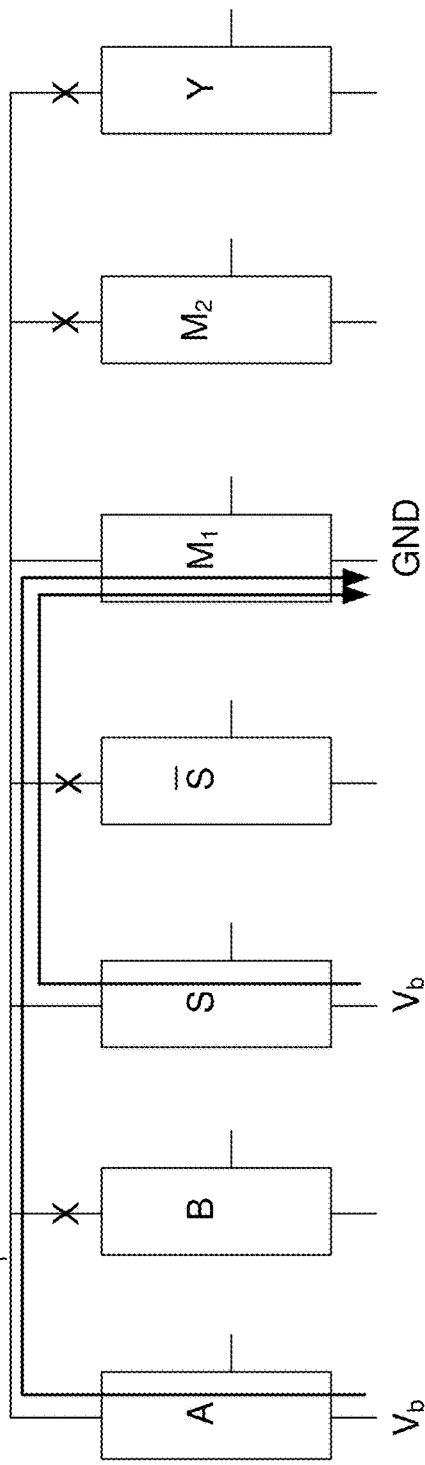
FIG. 17 shows the circuit of FIG. 13 during a fourth clock cycle of the stochastic scaled addition.

After the NOT operation has been performed, the AND operation of AND gate 1206 is performed by connecting logic-memory cells A, S and $M_1$ to common logic line 1302 and applying voltages at the read/write control conductors of those logic-memory cells to cause current to pass through logic-memory cells A and S and into and through logic-memory cell $M_1$ as shown in FIG. 17. If the total current from both logic-memory cell A and logic memory cell S is sufficient, the state of logic-memory cell $M_1$ will change.

Figure 18:
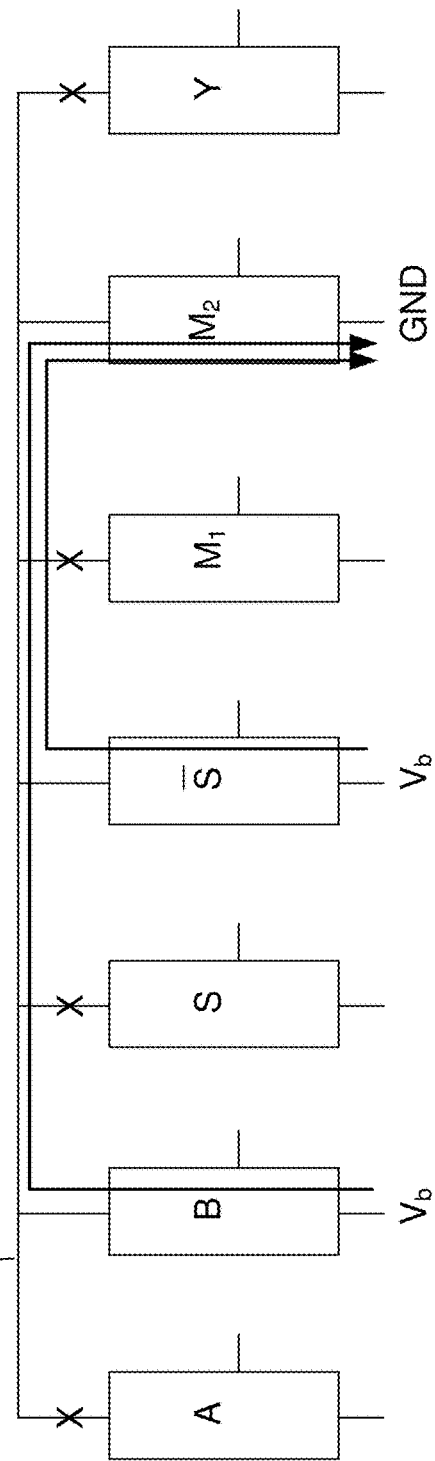
FIG. 18 shows the circuit of FIG. 13 during a fifth clock cycle of the stochastic scaled addition.

The operation of AND gate 1204 is then performed in FIG. 18 by connecting logic-memory cells B, $\overline{S}$ and $M_2$ to common logic line 1302 and disconnecting the remaining logic-memory cells from common logic line 1302. Current is then passed through logic-memory cells B and $\overline{S}$ and into and through logic-memory cell $M_2$. If the total current is sufficient, the state of logic-memory cell $M_2$ is changed.

The operation of OR gate 1208 is then implemented as shown in FIG. 19 by connecting logic-memory cells $M_1$, $M_2$ and Y to common logic line 1302 and disconnecting the remaining logic-memory cells from common logic line

1302. Current is then passed through logic-memory cells $M_1$ and $M_2$ and into and through logic-memory cell Y by applying voltages to the read/write control conductors of these logic-memory cells. If the total current is sufficient, the state of logic-memory cell Y changes.

The final state of logic-memory cell Y is then read as shown in FIG. 20 by disconnecting all the logic-memory cells from the common logic line 1302 and applying a read voltage between the individual read/write conductor and the read/write control conductor of logic-memory cell Y.

As an alternative to performing scaled addition using the multiplexer of FIG. 12, stochastic scaled addition can be performed by implementing MAJ3 logic with one of the inputs set to a probability of 0.5. In particular, two input bitstreams A and B and a scaling bitstream S applied to a MAJ3 logic gate produces an output bitstream Y where the percentage of 1's in Y is equal to P(S)*[P(A)+P(B)] where P(S) is the percentage of 1's in the scaling input stream S, which is fixed to 0.5, P(A) is the probability of a 1 appearing in input bitstream A and P(B) the probability of a 1 appearing in input bitstream B.

Figure 21:
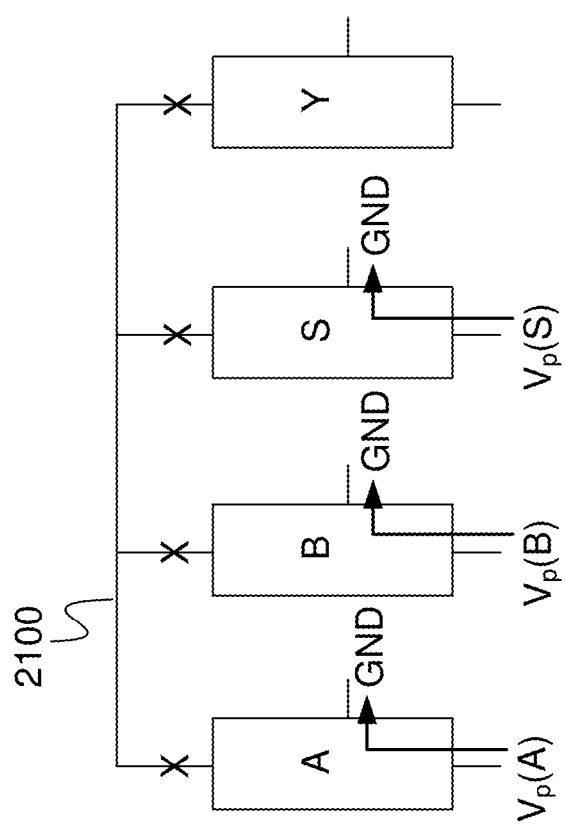
FIG. 21 shows a simplified diagram of an alternative circuit for performing scaled addition during a second clock cycle.
Figure 22:
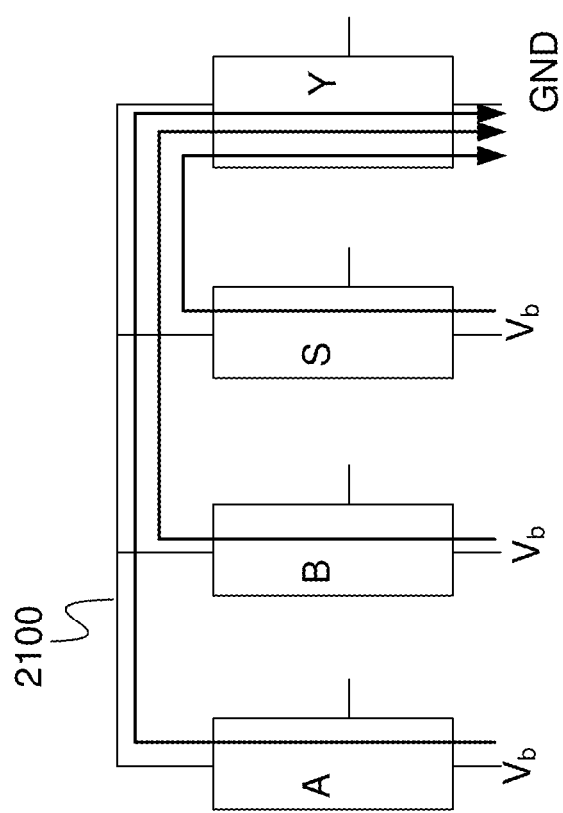
FIG. 22 shows the circuit of FIG. 21 during a third clock cycle.

FIGS. 21 and 22 show such stochastic scaling addition performed using the present embodiments. In FIGS. 21 and 22, the step of resetting the logic-memory cells and the step of reading the output logic-memory cell are not shown for simplicity. In FIG. 21, the step of perturbing logic-memory cell A, logic-memory cell B and logic-memory cell S is shown. During this step, logic-memory cells A, B, S and Y are disconnected from common logic line 2100 while voltage pulses $V_p(A)$, $V_p(B)$, $V_p(S)$ are applied to read/write control conductors of logic-memory cells A, B and S, respectfully. The amplitude of the voltage pulses determines the probability with which the state of logic-memory cells A, B and S will change in response to the voltage pulse. The amplitudes of $V_p(A)$, $V_p(B)$, are selected to represent the input to the scaled addition and the amplitude of $V_p(S)$ is selected to achieve a probability of 0.5.

After the input logic-memory cells have been randomly set, the majority logic operation is performed as shown in FIG. 22 by connecting the logic conductors of all of the logic-memory cells to common logic line 2100 and applying a bias voltage $V_b$ to the read/write control conductors of logic-memory cells A, B and S and ground to the read/write control conductor of logic-memory cell Y so as to cause current to flow through logic-memory cells A, B and S and into logic-memory cell Y. The sum of the currents from logic-memory cells A, B, and S determines whether the state of logic-memory cell Y changes. In particular, if the sum of the current through logic-memory cell A, B and S is greater than the threshold current needed to change the state of logic-memory cell Y, then logic-memory cell Y will change states. Otherwise, logic-memory cell Y will not change states. The state of logic-memory cell Y is then read. These steps are repeated for every bit in the bit stream and the percentage of 1's in the output bitstream provided by Y represents the result of the scaled addition.

The stochastic calculation circuits described above are merely examples of possible stochastic computing circuits that can be constructed using logic-memory cells with stochastically set values. Any stochastic computation that can be performed using logic devices can be implemented using the logic-memory cells with stochastically set values.

The present embodiments may also be used in stochastic calculations that have multiple layers. In such multi-layer circuits, different logic-memory cells can be processing different bits of the bitstream at the same time. For example, while an output logic-memory cell Y is being read for one bit of the bit stream, an input logic-memory cell can be perturbed for another bit in the bitstream.

Figures 23, 24:
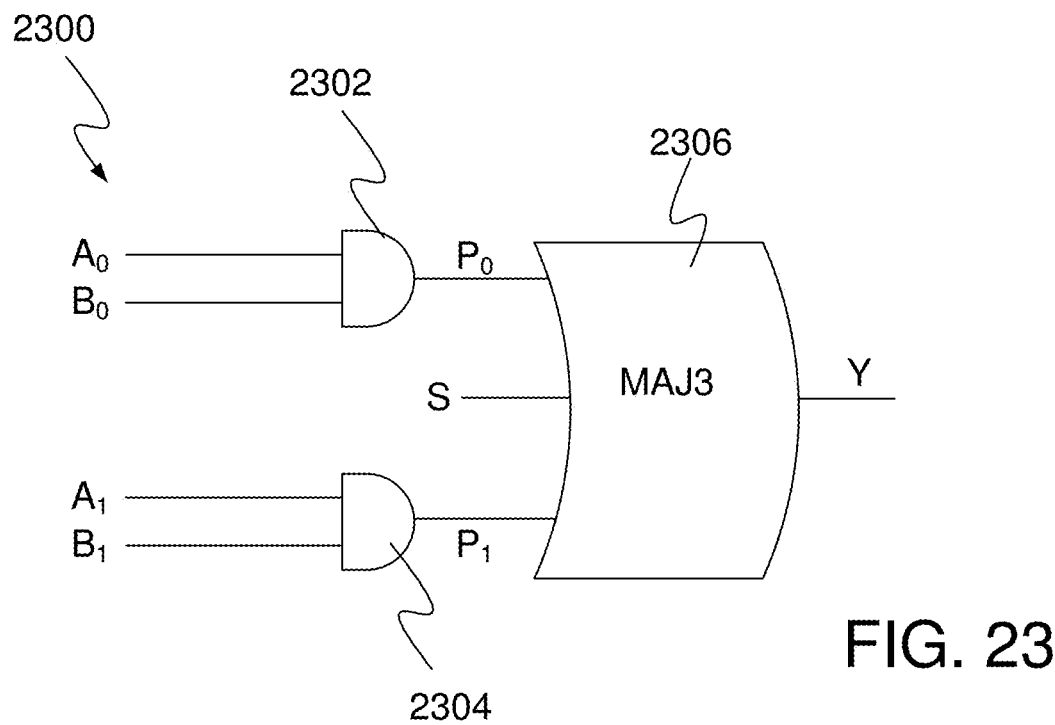
FIG. 23 shows a diagram of a logic circuit for implementing a stochastic calculation of $P(Y) \approx 0.5*[P(A_0)*P(B_0)+P(A_1)*P(B_1)] \ldots$ FIG. 24 provides an example of a task scheduling table for the circuit of FIG. 23.

FIG. 23 shows a logic circuit 2300 for implementing a stochastic calculation of P(Y) 0.5*[P($A_0$)*P($B_0$)+P($A_1$)*P($B_1$)]. Logic circuit 2300 includes AND gate 2302, which receives inputs $A_0$ and $B_0$, AND gate 2304, which receives $A_1$ and $B_1$ and majority circuit 2306 which receives the output of AND gate 2302, $P_0$, the output of AND gate 2304, $P_1$, and the scaling input, S. The output of majority circuit 2306, Y, is the result of the stochastic calculation. In an implementation of logic circuit 2300 using logic-memory cells of the present embodiments, there is a separate logic-memory cell for each value $A_0$, $B_0$, $A_1$, $B_1$, S, $P_0$, $P_1$, and Y, with the values in $A_0$, $B_0$, $A_1$, $B_1$, S being stochastically set as described above for other stochastic calculations.

FIG. 24 provides an example of task scheduling for logic circuit 2300 implemented using logic-memory cells of the present embodiments. In step 1 of FIG. 24, logic-memory cells $A_0$, $B_0$, $A_1$, $B_1$, are reset. In step 2. while logic-memory cells $A_0$, $B_0$, $A_1$, $B_1$, are perturbed to provide random inputs, logic-memory cells S, $P_0$, and $P_1$ are reset. In step 3, a bias voltage is applied across logic-memory cell $P_0$ and input logic-memory cells $A_0$ and $B_0$ to write a value to logic-memory cell $P_0$. A bias voltage is also applied across logic-memory cell $P_1$ and input logic-memory cells $A_1$ and $B_1$ to write a value to logic-memory cell $P_1$. Scaling logic-memory cell S is perturbed in step 3 and output logic-memory cell Y is reset.

In step 4, logic-memory cells $A_0$, $B_0$, $A_1$, and $B_1$ begin the cycle for the next bit in the bitstream by being reset while simultaneously, a bias voltage is applied to logic-memory cells $P_0$, $P_1$ and S to cause current from those logic-memory cells to flow through output logic-memory cell Y. In step 5, while logic-memory cells $A_0$, $B_0$, $A_1$, and $B_1$ are perturbed for the next bit in the bitstream, logic-memory cells $P_0$, $P_1$ and S are reset in the next bit in the bitstream and the value stored in output logic-memory cell Y for the current bit in the bitstream is read. These overlapping cycles then continue until all of the bits in the bitstream have been processed.

By beginning work on a next bit in the bitstream before an output bit has been produced for a current bit in the bitstream, the task scheduling of FIG. 24 reduces the latency in performing the stochastic calculations.

Figure 25:
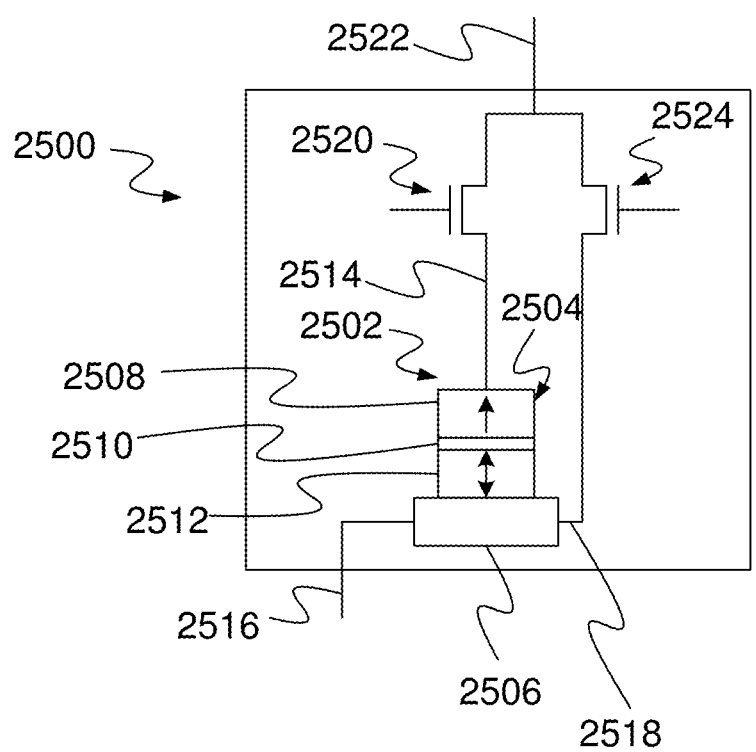
FIG. 25 is circuit diagram of a logic-memory cell in accordance with a third embodiment.

FIG. 25 provides an example of an alternative logic-memory cell 2500 that can be utilized in the embodiments described below. Logic-memory cell 2500 includes a three-terminal magnetic tunnel junction 2502, whose write mechanism is based on spin-orbit torque such as the spin-Hall effect (SHE). In the discussion below, spin-Hall effect (SHE) is referenced but the embodiments described below may be implemented using any spin-orbit torque system that changes the resistance of a magnetic tunneling junction using a current that does not pass through the magnetic tunneling junction itself. For simplicity, SHE-CRAM (spin-Hall effect computational random access memory) and SHE-MTJ have been used in the discussion below but these terms can be replaced with SOT-CRAM (spin-orbit torque-CRAM) or SOT-MTJ with equal effect.

The three-terminal magnetic tunneling junction 2502 consists of a magnetic tunneling junction 2504 seated on a spin-Hall channel 2506. The magnetic tunneling junction includes a fixed layer 2508, a tunnel barrier 2510 and a free layer 2512 between the tunnel barrier 2510 and the spin-Hall channel 2506. A first terminal 2514 is connected to fixed layer 2508, a second terminal 2516 is connected to one end of spin-Hall channel 2506, and a third terminal 2518 is connected to a second end of spin-Hall channel 2506.

Terminal 2516 acts as a read/write control conductor for logic-memory cell 2500. When the magnetic orientation of free layer 2512 is parallel to the magnetic orientation of fixed layer 2508, SHE-MTJ 2502 has a lower resistance for current flows across tunnel barrier 2510 than when the magnetic orientation of free layer 2512 is anti-parallel to the magnetic orientation of fixed layer 2508. The resistance state of SHE-MJT 2502 can be determined by passing a current between terminals 2514 and 2516.

The orientation of the magnetic moment of free layer 2512 can be definitively switched by passing a current of sufficient amplitude through spin-Hall channel 2506 (between terminals 2516 and 2518). In particular, passing a current that exceeds a threshold current density in a first direction through spin-Hall channel 2506 will set the orientation of the magnetic moment of free layer 2512 in a first direction while passing current that exceeds the threshold current density in a second direction through spin-Hall channel 2506 sets the orientation of the magnetic moment of free layer 312 in an opposite direction.

Terminal 2514 is connected to a switching transistor 2520 that is further connected to a logic/read-write conductor 2522. When logic-memory cell 2500 is used as input to a logical operation, a switching control signal causes switching transistor 2520 to connect terminal 2514 to logic/read-write conductor 2522 to allow a read current to pass from terminal 2516, through SHE-MTJ 2502, terminal 2514 and switching transistor 2520 to logic/read-write conductor 2522. Logic-memory cell 2500 also includes a switching transistor 2524 that is connected between terminal 2518 and logic/read-write conductor 2522. When logic-memory cell 2500 is to be written to, a switching control signal causes switching transistor 2520 to connect terminal 2518 to logic/read-write conductor 2522 to allow a write current to flow from logic/read-write conductor 2522, through switching transistor 2524, terminal 2518 and spin-Hall channel 2506 to terminal 2516. Logic-memory cell 2500 can be written to during a set/reset operation or during a logic operating.

Figure 26:
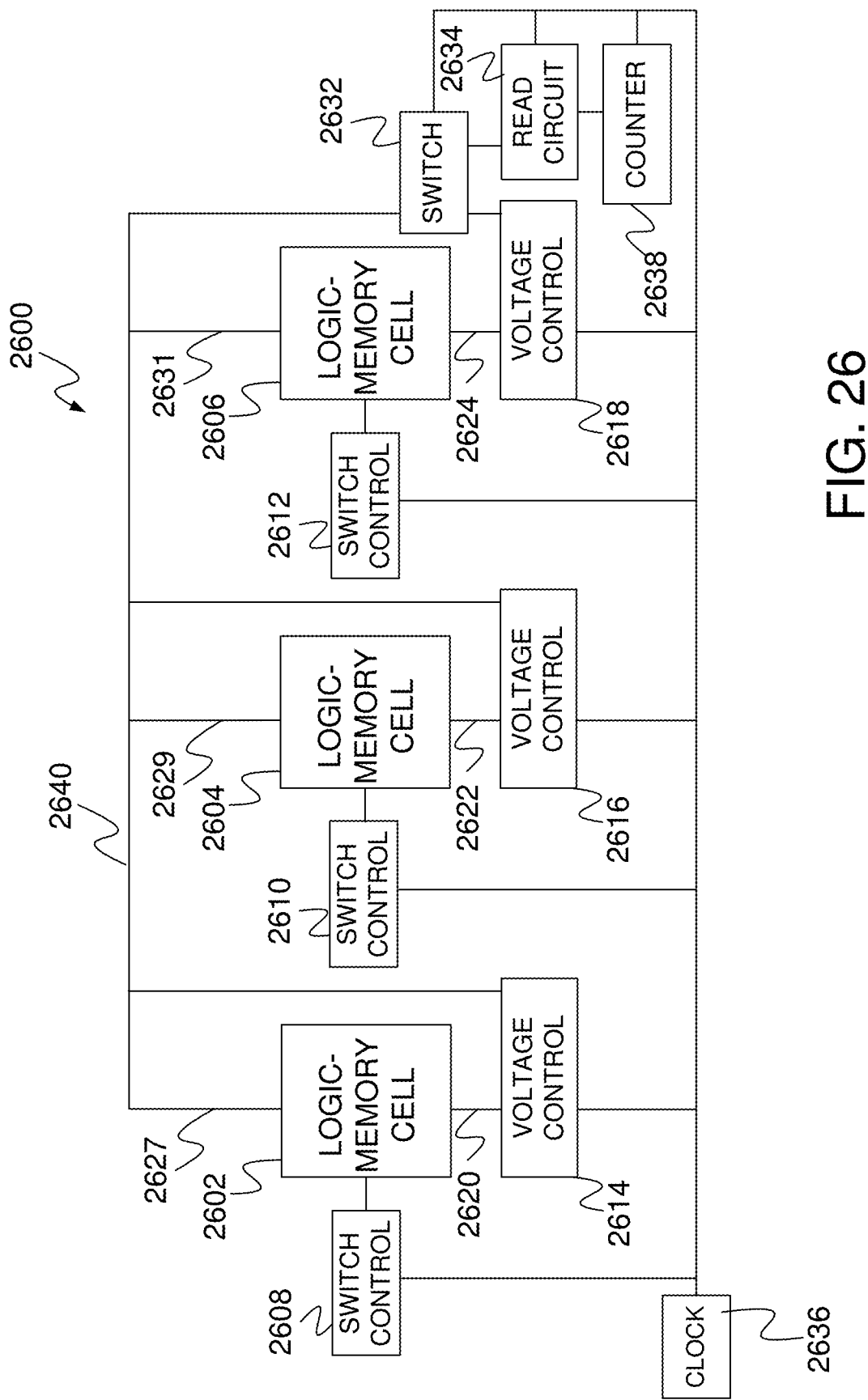
FIG. 26 is a diagram of a circuit for performing stochastic computing using logic-memory cells.

FIG. 26 provides block diagram of a stochastic multiplier circuit 2600 in which logic-memory cells such as logic-memory cell 2500 are used to provide the random inputs and perform the AND operation shown in FIG. 1. In FIG. 26, a logic-memory cell 2602 and a logic-memory cell 2604 operates as tunable random number generators that provide random bitstreams with tunable probabilities to logic-memory cell 2606, which holds the output of the AND operations performed on each bit of the input bitstreams. Logic memory cells 2602, 2604 and 2606 each have the same structure as logic-memory cell 2500 of FIG. 25 with respective logic/read-write conductors 2627, 2629 and 2631 that are each connected to a logic line 2640. Logic memory cells 2602, 2604 and 2606 also have respective read/write control conductors 2620, 2622 and 2624.

For each logic-memory cell, there is a respective switch control, such as switch controls 2608, 2610 and 2612, which control the internal switching transistors within the logic-memory cells through control lines between the switch controls and the gates of the switching transistors. In addition, for each logic-memory cell there is an associated voltage control, such as voltage controls 2614, 2616 and 2618, which control the voltages applied to the read/write control conductors 2620, 2622 and 2624 and logic/read-write conductors 2627, 2629, and 2631 during set/reset operations and during read operations. Voltage controls 2614, 2616 and 2618 also control the voltages applied to read/write control conductors 2620, 2622 and 2624 during logic operations.

There is an additional switch 2632 connected between logic line 2640, voltage control 2618 and a read circuit 2634. Switch 2632 controls whether logic line 2640 is connected to voltage control 2618 or to read circuit 2634. A clock 2636 is connected to each switch control 2608, 2610 and 2612, each voltage control 2614, 2616 and 2618, switch 2632, read circuit 2634 and a counter 2638. Clock 2636 generates a clock signal that synchronizes the operations of the various components connected to clock 2636. Read circuit 2634 is also connected to counter 2638. Switch controls 2608, 2610, and 2612, voltage controls 2614, 2616, and 2618, switch 2632 and read circuit 2634 are each referred to as a control element.

FIGS. 27-33 depict the states of logic-memory cells 2602, 2604 and 2606 for respective clock cycles of clock 2636 during a stochastic multiplication. In particular, the states shown in FIGS. 27-33 are for seven clock cycles used to process one bit in the bitstream. For simplicity, the switching controls, voltage controls, read circuit, counter and clock are not shown in FIGS. 27-33 but those skilled in the art will recognize that some of those components are used to place the logic-memory cells in the depicted states.

Figure 27:
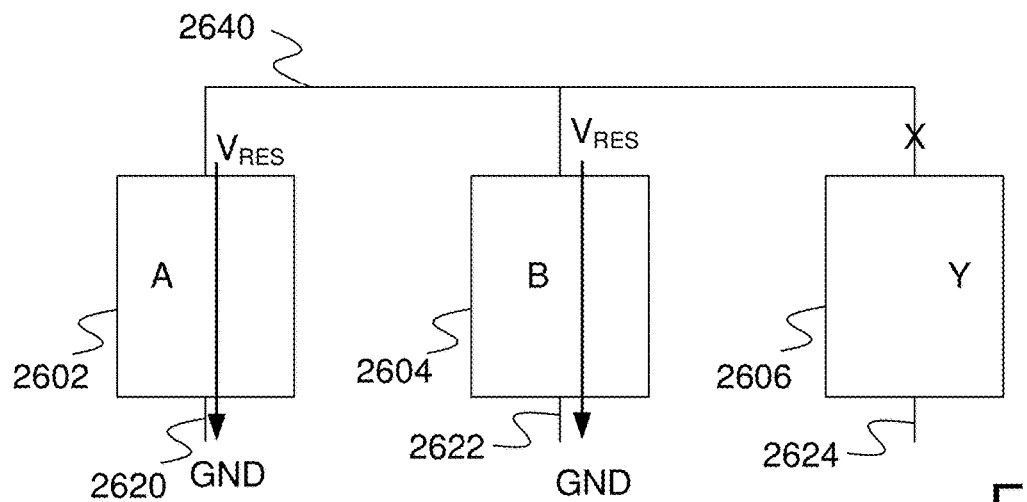
FIG. 27 is a simplified diagram of the circuit of FIG. 26 during a first clock cycle.

In FIG. 27, switch control 2612 causes logic-memory cell 2606 to be disconnected from common logic line 2640 as indicated by the X at the top of logic-memory cell 2606. In particular, switch control 2612 causes switching transistors 2520 and 2524 in logic-memory cell 2606 to disconnect terminals 2502 and 2518 from logic line 2640. Switch controls 2608 and 2610 cause switching transistor 2524 in logic-memory cells 2602 and 2604 to connect terminal 2518 to logic line 2640. In addition, switch 2632 connects logic line 2640 to a voltage Vres through voltage control 2618. Voltage controls 2614 and 2616 apply ground to read/write conductors 2620 and 2622 of logic-memory cells 2602 and 2604. This causes a reset current to pass through spin-Hall channel 2506 of logic-memory cells 2602 and 2604 thereby setting logic-memory cells 2602 and 2604 to digital values of "0".

Figure 28:
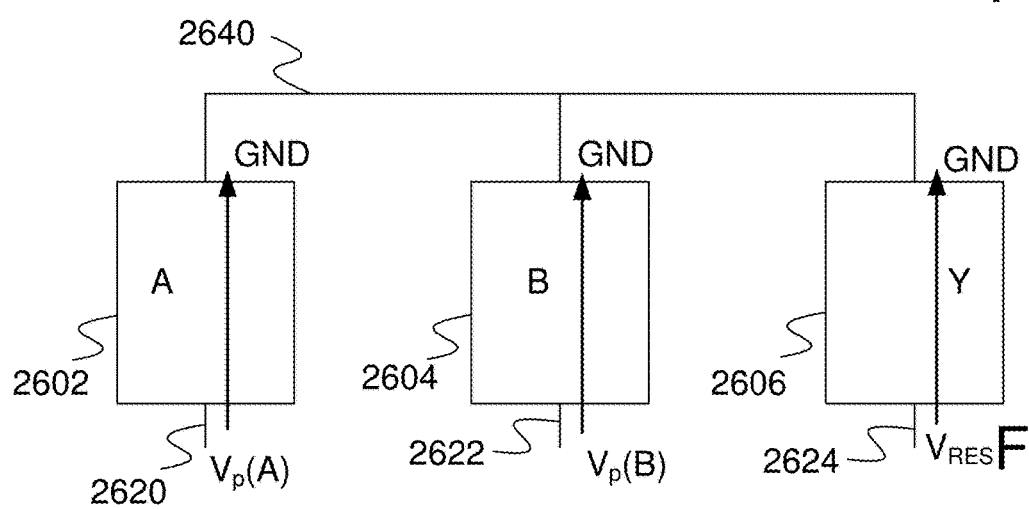
FIG. 28 is a simplified diagram of the circuit of FIG. 26 during a second clock cycle.

In FIG. 28, terminal 2518 in logic-memory cells 2602 and 2604 continue to be connected to logic line 2640. Switch control 2612 causes switching transistor 2524 in logic-memory cell 2606 to connect terminal 2518 to logic line 2640. Switch 2632 connects logic line 2640 to ground through voltage control 2618. Voltage control 2614 applies a voltage pulse of amplitude $V_p(A)$ to read/write control conductor 2620 of logic-memory cell 2602 and voltage control 2616 applies a voltage pulse of amplitude $V_p(B)$ to read/write control conductor 2622 of logic-memory cell 2604. The respective amplitudes of the voltages determines the current amplitude passing through logic-memory cells 2602 and 2604 and thereby determines the probability that the respective logic-memory cell will switch to a value of 1. Thus, the voltages applied in FIG. 28 randomly set the states of logic-memory cells 2602 and 2604 but do so with a selected probability.

Voltage control 2618 applies a voltage V res to read/write control conductor 2624 of logic-memory cell 2606. This causes a reset current to pass through spin-Hall channel 2506 of logic-memory cell 2606 thereby setting logic-memory cell 2606 to a digital value of "1".

Figure 29:
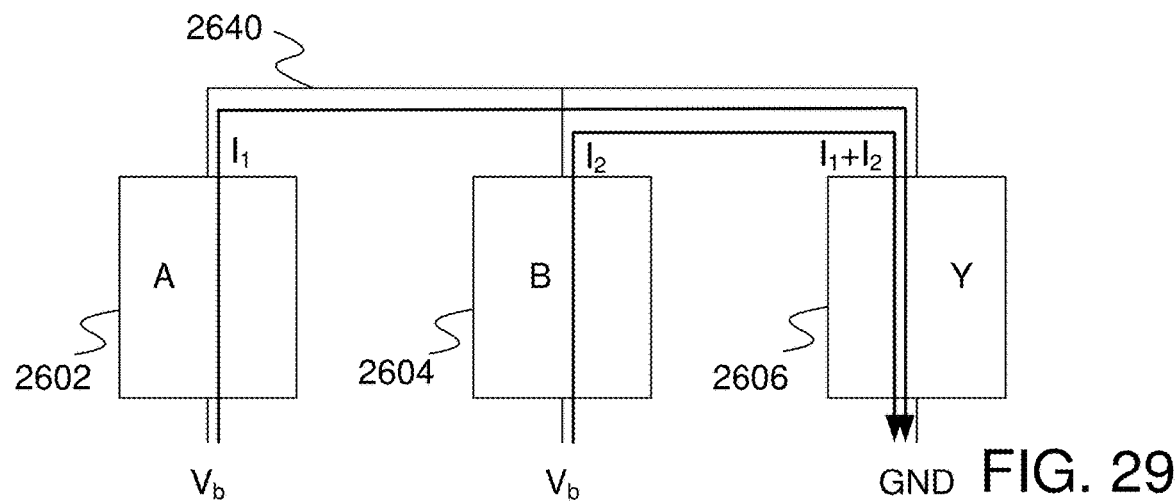
FIG. 29 is a simplified diagram of the circuit of FIG. 26 during a third clock cycle.

In FIG. 29, switch controls 2608 and 2610 cause switching transistors 2520 to connect terminals 2514 of logic-memory cells 2602 and 2604 to logic line 2640 while causing switching transistors 2524 to disconnect terminals 2518 of logic-memory cells 2602 and 2604 from logic line 2640. Switch control 2612 causes switching transistor 2524 of logic memory cell 2606 to connect terminal 2518 to logic line 2640. Voltage controls 2614 and 2616 apply a bias voltage $V_b$ to the read/write control conductors 2620 and 2622 of input logic-memory cells 2602 and 2604. Voltage control 2618 applies ground to read/write control conductor 2624 of output logic-memory cell 2606. These voltages cause current to flow through both logic-memory cell 2602 and logic-memory cell 2604 and into output logic-memory cell 2606 such that both of the currents from input logic-memory cells 2602 and 2604 pass through output logic-memory cell 2606. The bias voltage $V_b$ is selected such that the current passing through output logic-memory cell 2606 deterministically sets the state of output logic-memory cell 2606. Thus, the total current either exceeds the threshold current or changing the state of logic-memory cell 2606 with 100% probability or the total current has 0% probability of switching the state of logic-memory cell 2606. In addition, the bias voltage is selected so that the state of output logic-memory cell 2606 will only stay "1" if both of input logic-memory cells 2602 and 2604 have a value of "1", thereby implementing the logic AND operation. If either input logic-memory cell 2602 or input-logic memory cell 2604 is a "0", the total current passing through output logic-memory cell 2606 will exceed the threshold current and will cause output logic-memory cell 2606 to switch to "0".

Figure 30:
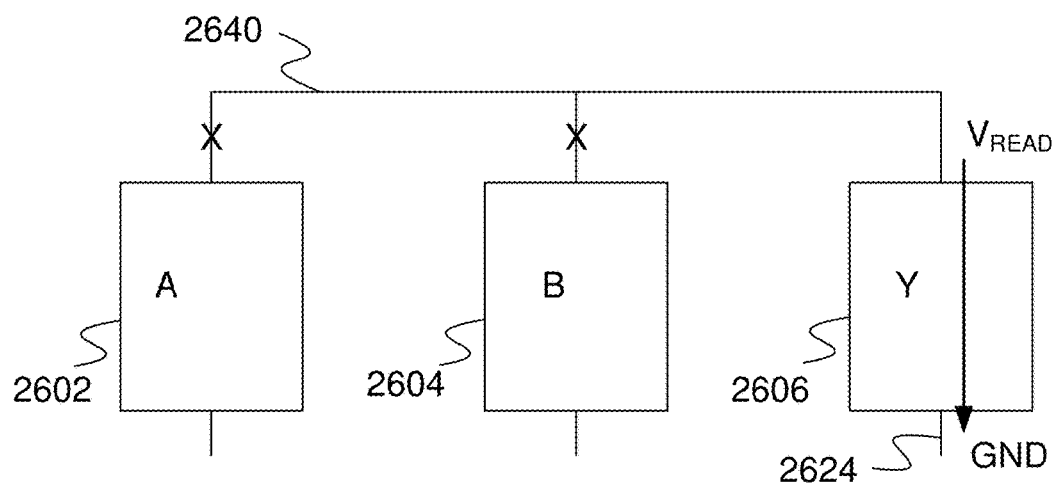
FIG. 30 is a simplified diagram of the circuit of FIG. 26 during a fourth clock cycle.

After the logic operation is complete, switch controls 2608 and 2610 disconnect logic-memory cells 2602 and 2604 from common logic line 740 as shown in FIG. 30. Switch control 2612 causes switching transistor 2520 to connect terminal 2514 of logic-memory cell 2606 to logic line 2640 and causes switching transistor 2520 to disconnect terminal 2518 from logic line 2640. Switch 2632 then connects logic line 2640 to read circuit 2634. Read circuit 2634 then applies a read voltage V READ to logic line 2640 while voltage control 2618 applies ground to read/write control conductor 2624. Read circuit 2634 measures the resistance provided by logic-memory cell 2606 to determine the state of logic-memory cell 2606. When the state is "1", read circuit 2634 increments counter 2638. When the state is "0", read circuit 2634 does not increment counter 2638.

The clock cycles of FIGS. 27-30 are repeated for each bit in the random bitstream. This results in a series of clock cycles for resetting the logic-memory cells (FIGS. 27, 28), a series of clock cycles for randomly setting the input logic-memory cells (FIG. 28), a series of clock cycles for using the randomly set input values to write to the output logic-memory cell (FIG. 29) and a series of clock cycles for reading the value stored in the output logic-memory cell (FIG. 30).

Figure 31:
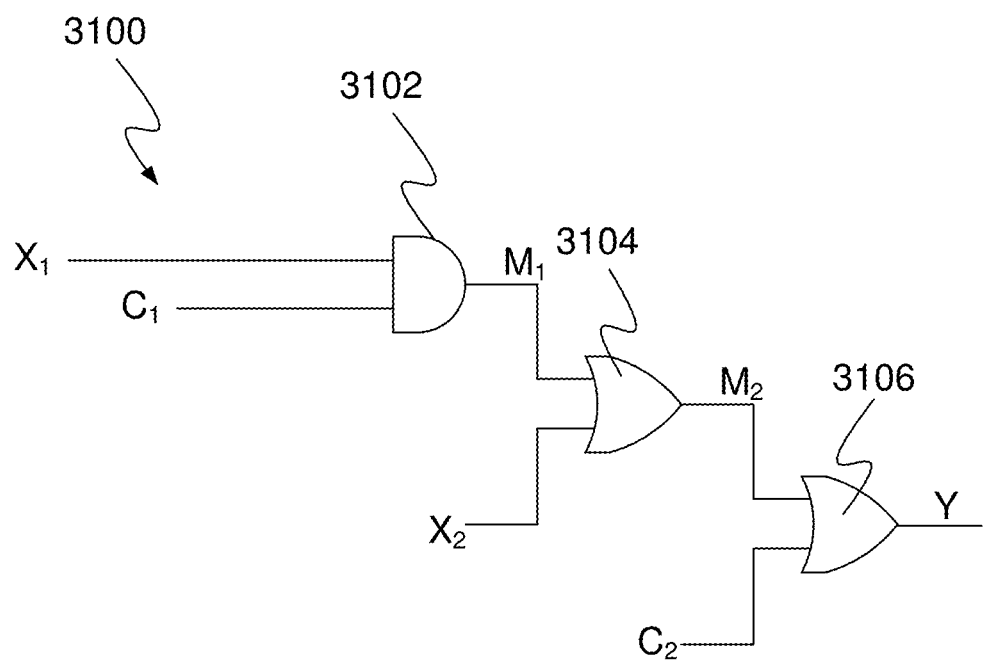
FIG. 31 is circuit diagram of a logic circuit used to perform stochastic square root.

The present embodiments can also implement a square root function $Y=\sqrt{X}$ using a logic circuit 3100 shown in FIG. 31. In logic circuit 3100, a bitstream representing X, denoted as $X_1$, is input to an AND gate 3102 together with a bitstream representing a constant of 0.67, denoted as $C_1$. The output of AND gate 3102 and a second bitstream representing X, denoted as $X_2$, are provided as input to an OR gate 3104. Bitstreams $X_1$ and $X_2$ are different from each other and are generated independently but both have percentages of 1s that equal X. The output of OR gate 3104 and a bitstream representing a second constant of 0.18, denoted as $C_2$, are input to a second OR gate 3106. The percentage of 1s in the bitstream output by OR gate 3106 represents the output Y of the square root operation.

Figure 32:
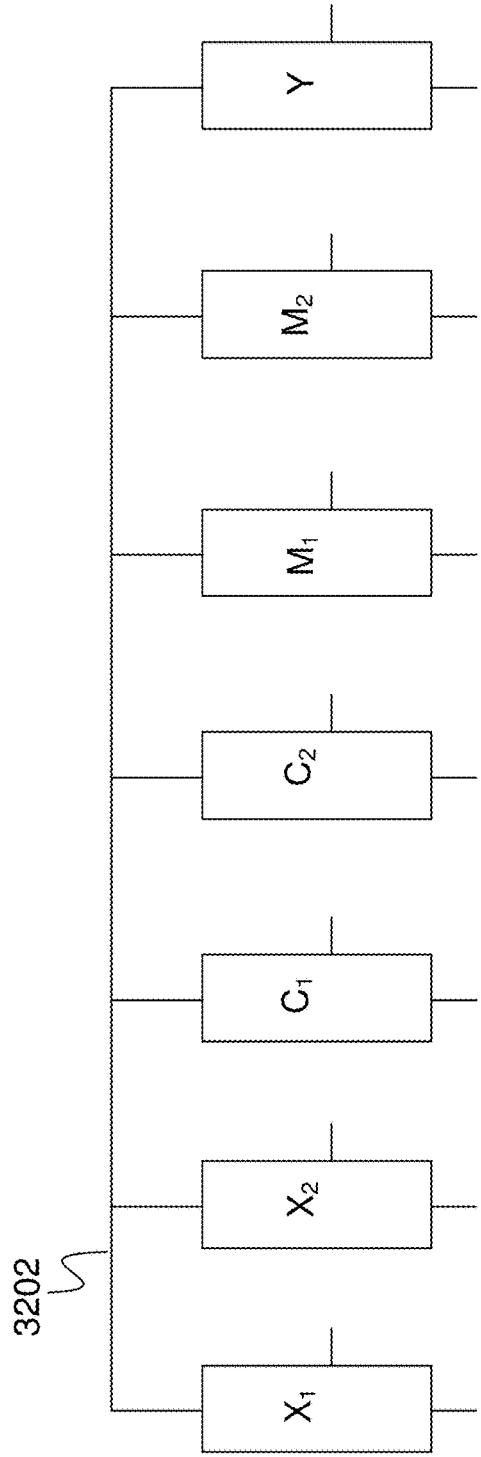
FIG. 32 is a simplified diagram of a circuit using logic-memory cells to implement the logic circuit of FIG. 31.

FIG. 32 shows an implementation of circuit 3100 using logic-memory cells in accordance with the present embodiment. In FIG. 32, the logic-memory cells are denoted by the values they provide in FIG. 31. In FIG. 32, a simplified depiction of the implementation is provided. Like the depictions shown in FIGS. 8-11 for the AND circuit of FIG. 7, FIG. 32 omits the switch control and voltage control for each logic-memory cell; the switch, read circuit and counter connected to output logic-memory cell Y, and the clock. Those skilled in the art will recognize that those components are present in the implementation but are not depicted for the sake of simplifying the figures.

FIGS. 33-38 depict the states of the logic-memory cells of FIG. 32 when executing a stochastic square root. In particular, the states shown in FIGS. 33-38 are used to process one bit in the bitstream. These states are repeated for each bit in the bitstream and a counter is used to determine the final value of the square root operation.

Figure 33:
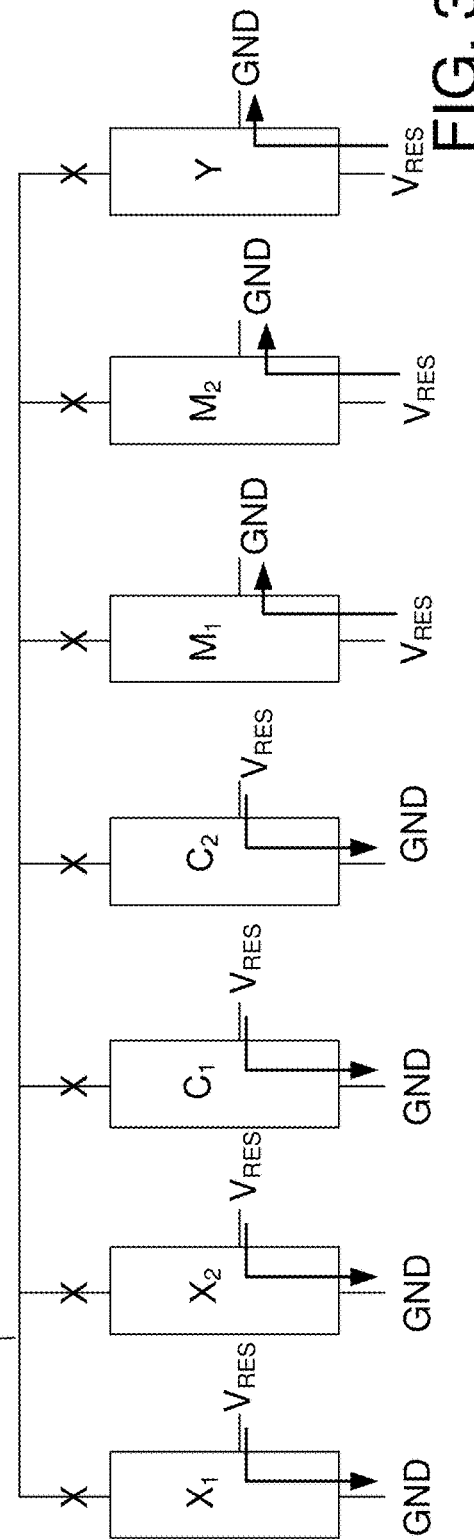
FIG. 33 shows the circuit of FIG. 32 during a first clock cycle of the stochastic square root.

In FIG. 33, all of the logic-memory cells are disconnected from a common logic line 3202 and each of the logic-memory cells are set to their initial values by applying a voltage between the read/write control conductor and the individual read/write conductor of each logic-memory cell.

Figure 34:
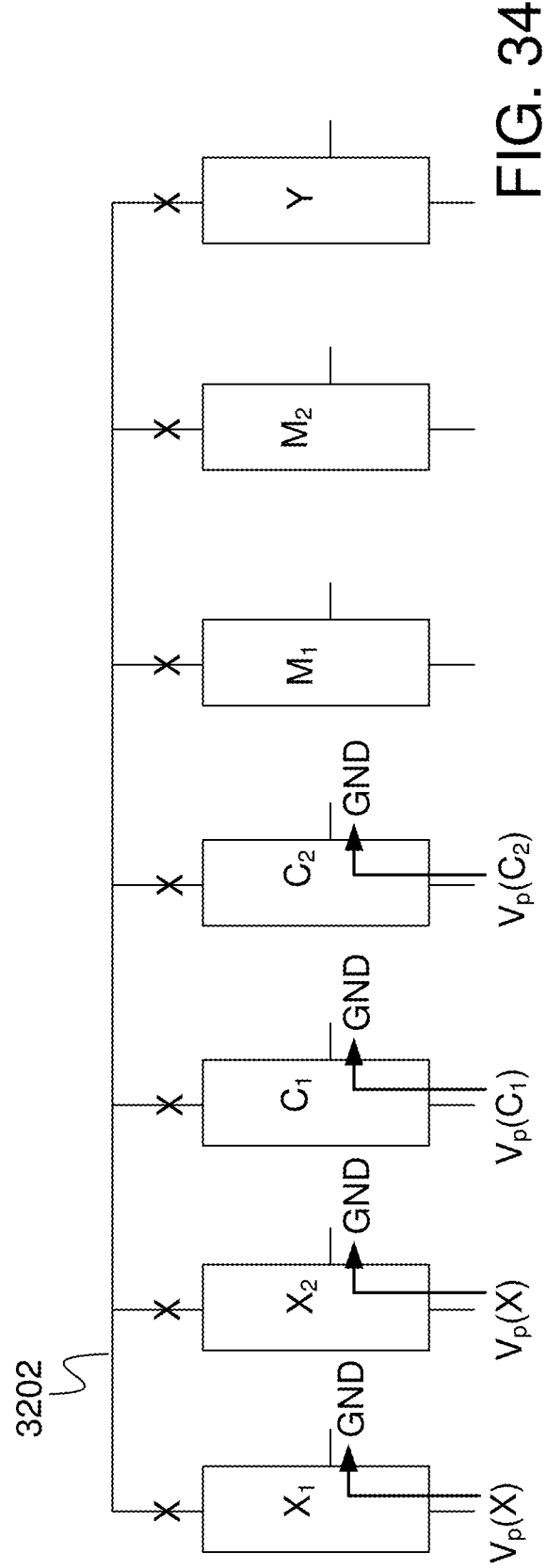
FIG. 34 shows the circuit of FIG. 32 during a second clock cycle of the stochastic square root.

As shown in FIG. 34, voltage pulses are then applied to logic-memory cells $X_1$, $X_2$, $C_1$, and $C_2$, to randomly set the states of $X_1$, $X_2$, $C_1$, and $C_2$. The same voltage pulse, $V_p(X)$, is applied to logic-memory cells $X_1$ and $X_2$ so that logic-memory cells $X_1$ and $X_2$ have the same probability of changing state. Note that even though logic-memory cells $X_1$ and $X_2$ have the same probability of changing states, they are not guaranteed to have the same value after voltage pulse $V_p(X)$. Instead, the application of the same voltage pulse $V_p(X)$ to $X_1$ and $X_2$ results in the percentage of 1s in the bitstreams provided by $X_1$ and $X_2$ being similar, if not identical, and approximately or exactly equal to the value of X. Voltage pulses $V_p(C_1)$ and $V_p(C_2)$ determine the probability that the state of these logic-memory cells will change due to the pulse, with this probability equaling 0.67 for $C_1$ and 0.18 for $C_2$.

Figure 35:
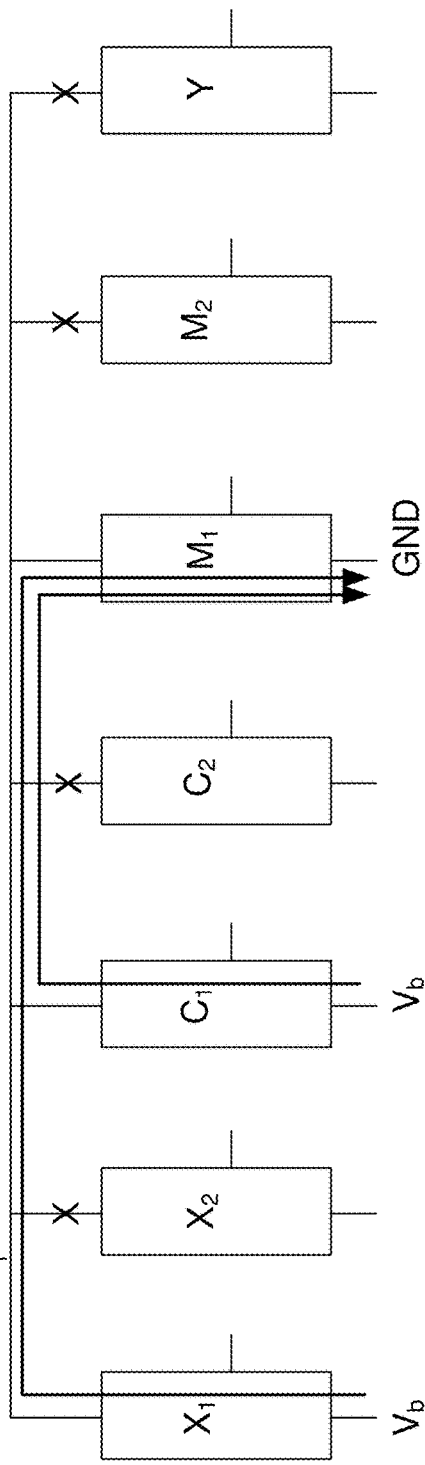
FIG. 35 shows the circuit of FIG. 32 during a third clock cycle of the stochastic square root.

The AND operation of AND gate 3102 is performed by connecting logic-memory cells $X_1$, $C_1$ and $M_1$ to common logic line 3202 and applying voltages at the read/write control conductors of those logic-memory cells to cause current to pass through logic-memory cells $X_1$ and $C_1$ and into and through logic-memory cell $M_1$ as shown in FIG. 35. If the total current from both logic-memory cell $X_1$ and logic memory cell $C_1$ is sufficient, the state of logic-memory cell $M_1$ will change.

Figure 36:
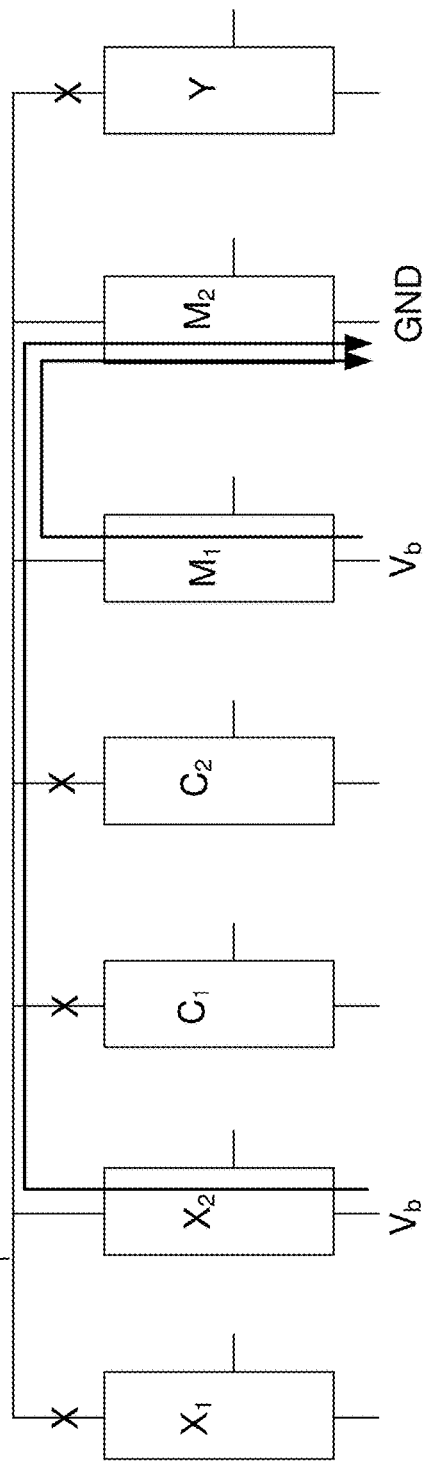
FIG. 36 shows the circuit of FIG. 32 during a fourth clock cycle of the stochastic square root.

The operation of OR gate 3104 is then performed in FIG. 36 by connecting logic-memory cells $X_2$, $M_1$ and $M_2$ to common logic line 3202 and disconnecting the remaining logic-memory cells from common logic line 3202. Current is then passed through logic-memory cells $X_2$ and $M_1$ and into and through logic-memory cell $M_2$. If the total current is sufficient, the state of logic-memory cell $M_2$ is changed.

Figure 37:
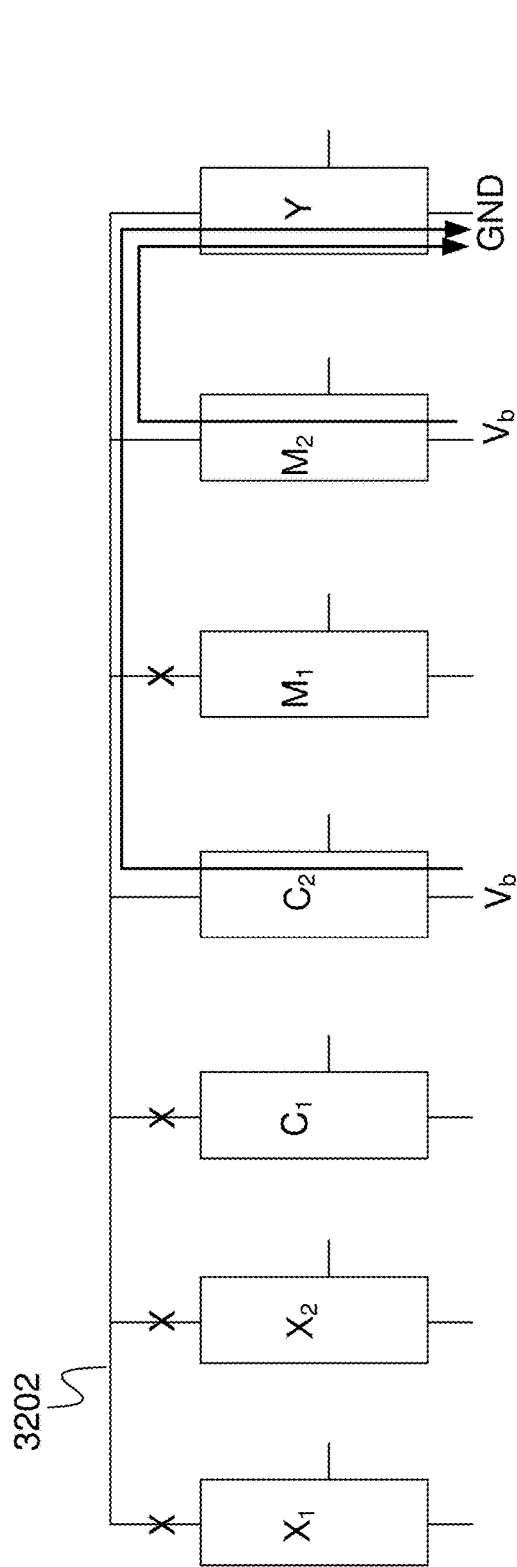
FIG. 37 shows the circuit of FIG. 32 during a fifth clock cycle of the stochastic square root.

The operation of OR gate 3106 is then implemented as shown in FIG. 37 by connecting logic-memory cells $C_2$, $M_2$ and Y to common logic line 3202 and disconnecting the remaining logic-memory cells from common logic line 3202. Current is then passed through logic-memory cells $C_2$ and $M_2$ and into and through logic-memory cell Y by applying voltages to the read/write control conductors of these logic-memory cells. If the total current is sufficient, the state of logic-memory cell Y changes.

Figure 38:
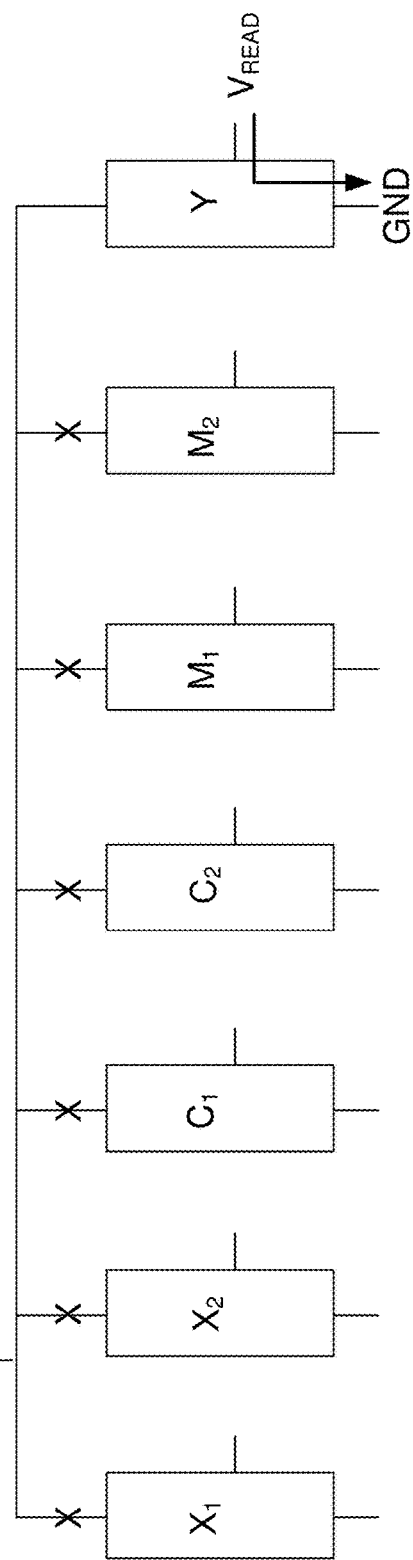
FIG. 38 shows the circuit of FIG. 32 during a sixth clock cycle of the stochastic square root.

The final state of logic-memory cell Y is then read as shown in FIG. 38 by disconnecting all the logic-memory cells from the common logic line 3202 and applying a read voltage between the individual read/write conductor and the read/write control conductor of logic-memory cell Y.

Stochastic computing using logic-memory cells as described above generally requires less circuit area and energy than performing calculations using logic-memory cells without stochastic computing. Stochastic computing using logic-memory cells also requires less circuit area, less computation time and less energy than conventional stochastic computing since separate tunable random number generators are not needed with the present embodiments. Instead, under the present embodiments, stochastic bitstream generation is embedded within the same logic-memory cells that are used in the computing steps. Stochastic computing using logic-memory cells has many applications including local image thresholding, object location, heart disaster prediction, for example. In particular, stochastic computing using logic-memory cells is well-suited to any application that utilizes probabilities as inputs to a calculation.

In the logic-memory cells discussed above, two-state devices 202, 302 and 2502 are set to one of two states to provide input to a logic operation and to store the results of the logic operation. Examples of two-state devices that can be used in the various embodiments include a magnetic tunnel junction operated by spin transfer torque switching; a magnetic tunnel junction operated by voltage-controlled magnetic anisotropy switching; a magnetic tunnel junction operated by voltage-controlled exchange coupling effect; a ferroelectric device; magnetic structures operated by spin-orbit torque switching; magnetic structures operated by magneto-electric effect; or ferroelectric-FET devices.

Although elements have been shown or described as separate embodiments above, portions of each embodiment may be combined with all or part of other embodiments described above.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms for implementing the claims.

What is claimed is:

1. A circuit comprising:
a first two-state device, a second two-state device and a third two-state device, each two-state device having a first resistance in a first state and a second resistance in a second state;
first control elements configured to apply a first voltage to the first two-state device to stochastically place the first two-state device in either the first state or the second state;
second control elements configured to apply a second voltage to the second two-state device to stochastically place the second two-state device in either the first state or the second state;
third control elements configured to send respective currents through the first two-state device and the second two-state device so as to place the third two-state device in either the first state or the second state based on the state of the first two-state device and the state of the second two-state devices.

2. The circuit of claim 1 wherein the first two-state device, the second two-state device and the third two-state device have a same structure.

3. The circuit of claim 1 wherein a probability of the first voltage causing the first two-state device to be placed in the first state is a function of the amplitude of the first voltage.

4. The circuit of claim 3 wherein the probability of the second voltage causing the second two-state device to be placed in the first state is a function of the amplitude of the second voltage.

5. The circuit of claim 1 wherein the first control element is configured to apply the first voltage during a first set of clock cycles, the second control element is configured to apply the second voltage during the first set of clock cycles, and the third control element is configured to send the respective currents during a second series of clock cycles interspersed with the first series of clock cycles.

6. The circuit of claim 5 further comprising fourth control elements for reading the state of the third two-state device after each of the clock cycles in the second series of clock cycles to form a series of output values.

7. The circuit of claim 6 wherein the series of output values represent a stochastic bitstream for a computation performed by the circuit.

8. The circuit of claim 1 wherein the first two-state device comprises one of:
a magnetic tunnel junction operated by spin transfer torque switching;
a magnetic tunnel junction operated by voltage-controlled magnetic anisotropy switching;
a magnetic tunnel junction operated by voltage controlled exchange coupling effect;
a ferroelectric device;
magnetic structures operated by spin-orbit torque switching;
magnetic structures operated by magneto-electric effect;
a NAND memory cell;
a phase change memory cell; or
ferroelectric-FET devices.

9. A method comprising:
applying a first pulse to a first device to randomly set a state of the first device;
applying a second pulse to a second device to randomly set a state of the second device;
using the state of the first device and the state of the second device to set a state of a third device; and
reading the state of the third device to produce part of a stochastic bitstream.

10. The method of claim 9 wherein a probability of the first device being in a first state represents a first input to a calculation, a probability of the second device being in the first state represents a second input to the calculation, and the percentage of values in the stochastic bitstream that correspond to the third device being in the first state represents an output of the calculation.

11. The method of claim 10 wherein applying the first pulse to the first device comprises setting the amplitude of the first pulse to control the probability of the first device being in the first state and wherein applying the second pulse to the second device comprises setting the amplitude of the second pulse to control the probability of the second device being in the first state.

12. The method of claim 9 wherein the first pulse and the second pulse are applied during a first clock cycle.

13. The method of claim 12 wherein using the state of the first device and the state of the second device to set the state of the third device comprises passing currents from the first device and second device through the third device during a next clock cycle after the first clock cycle.

14. The method of claim 13 wherein the state of the third device is set during a second clock cycle after the first clock cycle and the state of the third device is read during a third clock cycle after the second clock cycle.

15. The method of claim 14 wherein the first clock cycle, the second clock cycle and the third clock cycle are repeated to form the stochastic bitstream.

16. A circuit comprising:
control lines that during a first clock cycle:
apply a first input to a first circuit cell to cause the first circuit cell to be stochastically set to either a first state or a second state;
apply a second input to a second circuit cell to cause the second circuit cell to be stochastically set to either the first state or the second state; and
apply a third input to a third circuit cell to cause the third circuit cell to be in the first state; and
during a second clock cycle:
pass current from the stochastically set first circuit cell and the stochastically set second circuit cell through the third circuit cell so as to set the state of third circuit cell.

17. The circuit of claim 16 wherein the amplitude of the first input is associated with a probability of the first circuit cell being set to the first state.

18. The circuit of claim 17 wherein the amplitude of the second input is associated with a probability of the second circuit cell being set to the first state.

19. The circuit of claim 16 wherein during a third clock cycle the control lines:
apply a fourth input to the first circuit cell to cause the first circuit cell to be in the first state;
apply a fifth input to the second circuit cell to cause the second circuit cell to be in the first state; and
apply a sixth input to the third circuit cell to obtain the state of the third circuit cell.

20. The circuit of claim 19 wherein applying the sixth input to the third circuit cell to obtain the state of the third circuit cell comprises applying the sixth input to cause current to pass through the third circuit cell to a fourth circuit cell so as to set the state of the fourth circuit cell.

21. The circuit of claim 16 wherein the first circuit cell, the second circuit cell and the third circuit cell have a same structure.

* * * * *